United States Patent
Sun et al.

(10) Patent No.: US 11,606,726 B2
(45) Date of Patent: Mar. 14, 2023

(54) DETECTING QUALITY OF SERVICE (QOS) OF A SERVICE

(71) Applicant: Huawei Technologies Co., Ltd., Shenzhen (CN)

(72) Inventors: Dekui Sun, Shenzhen (CN); Han Zhou, Shanghai (CN); Zaifeng Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/828,562

(22) Filed: Mar. 24, 2020

(65) Prior Publication Data
US 2020/0229040 A1    Jul. 16, 2020

Related U.S. Application Data

(63) Continuation of application No. PCT/CN2018/104537, filed on Sep. 7, 2018.

(30) Foreign Application Priority Data

Sep. 25, 2017  (CN) .......................... 201710874968.0

(51) Int. Cl.
*H04W 28/24* (2009.01)
*H04W 28/02* (2009.01)
(Continued)

(52) U.S. Cl.
CPC ....... *H04W 28/24* (2013.01); *H04W 28/0268* (2013.01); *H04W 28/06* (2013.01); *H04W 28/10* (2013.01)

(58) Field of Classification Search
CPC . H04W 28/0268; H04W 28/24; H04W 28/06; H04W 28/10; H04W 24/08
See application file for complete search history.

(56) References Cited

U.S. PATENT DOCUMENTS 7,796,504 B1 * 9/2010 Owens .................... H04L 45/22
                                                       370/227
2003/0133408 A1    7/2003 Cheng et al.
(Continued)

FOREIGN PATENT DOCUMENTS

CN         1815970 A      8/2006
CN      104144446 A     11/2014
(Continued)

OTHER PUBLICATIONS

3GPP TS 29.244 V14.1.0, "3rd Generation Partnership Project; Technical Specification Group Core Network and Terminals; Interface between the Control Plane and the User Plane of EPC Nodes; Stage 3 (Release 14)," Sep. 2017, 146 pages.
(Continued)

*Primary Examiner* — Syed Ali
(74) *Attorney, Agent, or Firm* — Conley Rose, P.C.

(57) ABSTRACT

A method for detecting quality of service of a service includes obtaining, by a packet sending device, detection indication information, where the detection indication information is used to instruct the packet sending device to detect quality of service of a service; and sending, by the packet sending device, a detection packet to a packet receiving device based on the detection indication information, where the detection packet is used to detect the quality of service of the service.

20 Claims, 14 Drawing Sheets

(51) Int. Cl.
H04W 28/06 (2009.01)
H04W 28/10 (2009.01)

(56) References Cited

U.S. PATENT DOCUMENTS

| | | | | |
|---|---|---|---|---|
| 2004/0128665 | A1* | 7/2004 | Gouleau | H04L 69/22 717/176 |
| 2006/0245368 | A1 | 11/2006 | Ladden et al. | |
| 2007/0091804 | A1* | 4/2007 | Pan | H04L 65/1013 370/230 |
| 2007/0242620 | A1* | 10/2007 | Zhai | H04L 43/0829 370/252 |
| 2008/0037425 | A1* | 2/2008 | Pan | H04L 47/24 370/235 |
| 2008/0192763 | A1 | 8/2008 | Davis et al. | |
| 2012/0093006 | A1* | 4/2012 | Yang | H04L 65/1059 370/249 |
| 2013/0077499 | A1* | 3/2013 | Schmitz | H04J 3/0688 370/249 |
| 2013/0170350 | A1* | 7/2013 | Sarkar | H04L 47/2458 370/235 |
| 2014/0126581 | A1* | 5/2014 | Wang | H04W 4/50 370/431 |
| 2014/0169785 | A1* | 6/2014 | Roullot | H04B 10/40 398/67 |
| 2016/0072717 | A1* | 3/2016 | Ansari | H04L 45/64 370/412 |
| 2016/0081011 | A1 | 3/2016 | Cui et al. | |
| 2016/0353318 | A1 | 12/2016 | Liu | |
| 2017/0201586 | A1 | 7/2017 | Sobhy | |
| 2021/0006421 | A1* | 1/2021 | Guo | H04M 15/8228 |

FOREIGN PATENT DOCUMENTS

| | | |
|---|---|---|
| CN | 105075183 A | 11/2015 |
| CN | 105075188 A | 11/2015 |
| CN | 106961344 A | 7/2017 |
| CN | 107018518 A | 8/2017 |
| EP | 2996379 A1 | 3/2016 |
| JP | 2003101581 A | 4/2003 |
| JP | 2012205286 A | 10/2012 |

OTHER PUBLICATIONS

3GPP TS 37.320 V14.0.0 (Mar. 2017), "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 14)," 26 pages.

3GPP TS 22.186 V15.2.0, 3rd Generation Partnership Project; Technical Specification Group Services and System Aspects; Enhancement of 3GPP support for V2X scenarios; Stage 1 (Release 15), Sep. 22, 2017, 16 pages.

3GPP TS 23.501 V1.3.0, 3rd Generation Partnership Project; Technical Specification Group Services and System Aspects; System Architecture for the 5G System; Stage 2 (Release 15), Sep. 9, 2017, 174 pages.

3GPP TS 23.502 V1.2.0, 3rd Generation Partnership Project; Technical Specification Group Services and System Aspects; Procedures for the 5G System; Stage 2 (Release 15),Sep. 22, 2017, 165 pages.

C3-174060, Ericsson, "PCC rule in 5G," 3GPP TSG-CT WG3 Meeting #91, Krakow, Poland, Aug. 21-25, 2017, 4 pages.

S2-173799, Ericsson, "The Policy and Charging Control Rule",SA WG2 Meeting #121, May 15-19, 2017, Hangzhou, China, 8 pages.

S2-174901, Nokia, et al., "Update on policy control for QoS control functionalities," SA WG2 Meeting #122, Jun. 26-30, 2017, San Jose Del Cabo, Mexico, 6 pages.

S2-176190, Huawei, et al., "TS 23.501:Clarification about the QoS flow binding for SDFs," SA WG2 Meeting #122Bis, Aug. 21-25, 2017, Sophia Antipolis, France, 4 pages.

S2-176661, Nokia, et al., "PCF provisioning of non-standardized 5QI," SA WG2 Meeting #122bis, Aug. 21-25, 2017, Sophia-Antipolis, France, 5 pages.

S2-171482, Ericsson, "[23.501] Cleanup of QoS framework description," SA WG2 Meeting #119, Feb. 13-17, 2017, 10pages.

* cited by examiner

DETECTING QUALITY OF SERVICE (QOS) OF A SERVICE

CROSS-REFERENCE TO RELATED APPLICATIONS

This application is a continuation of International Patent Application No. PCT/CN2018/104537, filed on Sep. 7, 2018, which claims priority to Chinese Patent Application No. 201710874968.0, filed on Sep. 25, 2017. The disclosures of the aforementioned applications are hereby incorporated by reference in their entireties.

TECHNICAL FIELD

This application relates to the field of communications technologies, and in particular, to a method, device, and system for detecting quality of service of a service.

BACKGROUND

To meet challenges of wireless broadband technologies and remain leading-edge advantages of a 3rd generation partnership project (3GPP) network, the 3GPP standards organization formulated a next generation mobile communications system network architecture in late 2016, which is referred to as a 5th generation (5G) network architecture.

An ultra-reliable and low-latency communications (URLLC) scenario is defined in the 5G network architecture, and mainly includes services that require a low-latency and high-reliable connection, for example, unmanned driving and industrial automation. The services are carried by using different quality of service (QoS) flows in a 5G network. As shown in FIG. 1, there may include a QoS flow 1, a QoS flow 2, and a QoS flow 3 between a terminal and a user plane function (UPF) entity. Different QoS flows may have different service requirements, for example, a requirement of a delay, a packet loss rate, or a jitter.

The foregoing URLLC scenario mostly includes services related to life safety or production safety, and therefore an error is intolerant. However, in view of network construction, a delay, an error, and even a network fault cannot be eliminated. Therefore, when the foregoing services related to life safety or production safety are carried out in the 5G network, real-time quality of service detection of the services is required in the 5G network. In this way, when quality of service of the services does not meet a preset condition, a corresponding adjustment measure or protection measure can be taken. For example, the existing 5G technical standards (TS) 22186 specifies that, in a remote driving scenario, an end-to-end delay between a terminal and a server always needs to be within 5 ms. If it can be detected in time that the quality of service does not meet the preset condition, a vehicle may be controlled to enter an autonomous driving mode from a remote driving mode. In this way, an accident caused by a network fault can be avoided.

Currently, connectivity between different devices in a network can be monitored by using a bidirectional forwarding detection (BFD) mechanism. However, as shown in FIG. 1, different QoS flows for carrying different services may exist between devices, and in this case, there is no related solution to quality of service detection of the services.

SUMMARY

Embodiments of this application provide a method, device, and system for detecting quality of service of a service, to detect quality of service of a service.

To achieve the foregoing objective, the embodiments of this application provide the following technical solutions.

According to a first aspect, a method for detecting quality of service of a service is provided, where the method includes: obtaining, by a packet sending device, detection indication information, where the detection indication information is used to instruct the packet sending device to detect quality of service of a service; and sending, by the packet sending device, a detection packet to a packet receiving device based on the detection indication information, where the detection packet is used to detect the quality of service of the service. According to the method for detecting quality of service of a service provided in this embodiment of this application, the packet sending device can obtain the detection indication information, and send the detection packet to the packet receiving device based on the detection indication information. In this way, after receiving the detection packet from the packet sending device, the packet receiving device can determine the quality of service of the service based on the detection packet. Therefore, based on the solution, the quality of service of the service can be detected.

Optionally, the obtaining, by a packet sending device, detection indication information includes: receiving, by the packet sending device, the detection indication information from a first network device or the packet receiving device. Based on the solution, the packet sending device can obtain the detection indication information.

Optionally, the obtaining, by a packet sending device, detection indication information includes: determining, by the packet sending device, the detection indication information based on at least one of a quality of service requirement, a local policy, and a local context that are of the service. Based on the solution, the packet sending device can obtain the detection indication information.

Optionally, the obtaining, by a packet sending device, detection indication information includes: receiving, by the packet sending device, first indication information from a first network device or the packet receiving device, where the first indication information is used to instruct the packet sending device to detect the quality of service of the service; and determining, by the packet sending device, the detection indication information based on at least one of the first indication information and a quality of service requirement, a local policy, and a local context that are of the service. Based on the solution, the packet sending device can obtain the detection indication information.

Optionally, the first indication information in this embodiment of this application includes a service flow identifier of the service, and the service flow identifier is used to indicate a service flow of the service.

Optionally, the first indication information in this embodiment of this application includes a service type of the service.

Optionally, the first indication information in this embodiment of this application includes a sending period of the detection packet.

Optionally, the first indication information in this embodiment of this application includes at least one of an operation type, a detection type, and a context identifier of the detection packet; and the operation type is quality of service detection of the service, the detection type is used to indicate a type of the quality of service detection, and the context identifier of the detection packet is used to indicate a context of the detection packet.

Optionally, the detection indication information in this embodiment of this application includes the service flow identifier of the service, and the service flow identifier is used to indicate the service flow of the service.

Optionally, the detection indication information in this embodiment of this application includes the service type of the service.

Optionally, the detection indication information in this embodiment of this application further includes at least one of the operation type, the sending period of the detection packet, the detection type, and the context identifier of the detection packet; and the operation type is the quality of service detection of the service, the detection type is used to indicate the type of the quality of service detection, and the context identifier of the detection packet is used to indicate the context of the detection packet.

Optionally, the method further includes: associating, by the packet sending device, the detection indication information with the service flow of the service.

In a possible implementation, the packet sending device includes a terminal, a user plane function entity, a gateway, or a gateway user plane entity, and the service flow includes a service aggregation flow or a service subflow; or the packet sending device includes an access device, and the service flow includes a service aggregation flow; and the associating, by the packet sending device, the detection indication information with the service flow of the service includes: determining, by the packet sending device, the service flow of the service based on the detection indication information; generating, by the packet sending device, a local context of the detection packet based on the detection indication information; and storing, by the packet sending device, the local context of the detection packet into a context of the service flow of the service. Based on the solution, the packet sending device can associate the detection indication information with the service flow of the service.

In a possible implementation, the packet sending device includes a terminal, a user plane function entity, a gateway, or a gateway user plane entity, and the service flow includes a service aggregation flow or a service subflow; or the packet sending device includes an access device, and the service flow includes a service aggregation flow; and the associating, by the packet sending device, the detection indication information with the service flow of the service includes: determining, by the packet sending device, the service flow of the service based on the detection indication information; and generating, by the packet sending device, a local context of the detection packet based on the detection indication information, where the local context of the detection packet includes the service flow identifier of the service. Based on the solution, the packet sending device can associate the detection indication information with the service flow of the service.

In a possible implementation, the packet sending device includes an access device, and the service flow includes a service subflow; and the associating, by the packet sending device, the detection indication information with the service flow of the service includes: determining, by the packet sending device based on the detection indication information, a service aggregation flow to which the service flow of the service belongs; generating, by the packet sending device, the local context of the detection packet based on the detection indication information; and storing, by the packet sending device, the local context of the detection packet into a local context of the aggregation flow. Based on the solution, the packet sending device can associate the detection indication information with the service flow of the service.

In a possible implementation, the packet sending device includes an access device, and the service flow includes a service subflow; and the associating, by the packet sending device, the detection indication information with the service flow of the service includes: determining, by the packet sending device based on the detection indication information, a service aggregation flow to which the service flow of the service belongs; and generating, by the packet sending device, a local context of the detection packet based on the detection indication information, where the local context of the detection packet includes a service flow identifier of the service aggregation flow. Based on the solution, the packet sending device can associate the detection indication information with the service flow of the service.

According to a second aspect, a method for detecting quality of service of a service, where the method includes: obtaining, by a first network device, first indication information; and sending, by the first network device, the first indication information to a packet sending device, where the first indication information is used to instruct the packet sending device to detect quality of service of a service. According to the method for detecting quality of service of a service provided in this embodiment of this application, the first indication information is used to instruct the packet sending device to detect quality of service of a service. Therefore, after receiving the first indication information from the first network device, the packet sending device may detect the quality of service of the service based on the first indication information. Therefore, based on the solution, quality of service detection of a service can be implemented.

Optionally, the first indication information includes a service flow identifier of the service, and the service flow identifier is used to indicate a service flow of the service.

Optionally, the first indication information in this embodiment of this application includes a service type of the service.

Optionally, the first indication information in this embodiment of this application further includes a sending period of a detection packet, and the detection packet is used to detect the quality of service of the service.

Optionally, the first indication information in this embodiment of this application further includes at least one of an operation type, a detection type, and a context identifier of the detection packet; and the operation type is quality of service detection of the service, the detection type is used to indicate a type of the quality of service detection, the context identifier of the detection packet is used to indicate a context of the detection packet, and the detection packet is used to detect the quality of service of the service.

Optionally, the obtaining, by a first network device, first indication information includes: receiving, by the first network device, the first indication information from a second network device. Based on the solution, the first network device can obtain the first indication information.

Optionally, the obtaining, by a first network device, first indication information includes: determining, by the first network device, the first indication information based on at least one of a quality of service requirement, a local policy, and a local context that are of the service. Based on the solution, the first network device can obtain the first indication information.

Optionally, the obtaining, by a first network device, first indication information includes: receiving, by the first network device, second indication information from a second network device, where the second indication information includes at least one of the operation type, the service type of the service, address information of a terminal, a quality of service parameter, and a 5-tuple; and the operation type is the quality of service detection of the service, and at least one of the address information of the terminal, the quality of service parameter, and the 5-tuple is used to indicate the service flow of the service; and determining, by the first network device, the first indication information based on at least one of the second indication information and a quality of service requirement, a local policy, and a local context that are of the service. Based on the solution, the first network device can obtain the first indication information.

Optionally, the first network device is a session management entity, and the packet sending device is a terminal, an access device, or a user plane function entity; or the first network device is a gateway control plane entity, and the packet sending device is a terminal, an access device, or a gateway user plane entity; or the first network device is a gateway, and the packet sending device is a terminal or an access device.

According to a third aspect, a method for detecting quality of service of a service is provided, where the method includes: obtaining, by a packet sending device, detection indication information, where the detection indication information is used to instruct the packet sending device to detect quality of service of a service; sending, by the packet sending device, a detection packet to a packet receiving device based on the detection indication information, where the detection packet is used to detect the quality of service of the service; and receiving, by the packet receiving device, the detection packet from the packet receiving device, and determining the quality of service of the service based on the detection packet. According to the method for detecting quality of service of a service provided in this embodiment of this application, the packet sending device can obtain the detection indication information, and send the detection packet to the packet receiving device based on the detection indication information. In this way, after receiving the detection packet from the packet sending device, the packet receiving device can determine the quality of service of the service based on the detection packet. Therefore, based on the solution, the quality of service of the service can be detected.

Optionally, the obtaining, by a packet sending device, detection indication information includes: receiving, by the packet sending device, the detection indication information from a first network device. Based on the solution, the packet sending device can obtain the detection indication information.

Optionally, the method further includes: the obtaining, by a packet sending device, detection indication information includes: receiving, by the packet sending device, a first indication information from the first network device; and determining, by the packet sending device, the detection indication information based on at least one of the first indication information and a quality of service requirement, a local policy, and a local context that are of the service. Based on the solution, the packet sending device can obtain the detection indication information.

Optionally, the method further includes: receiving, by the first network device, second indication information from a second network device, where the second indication information includes at least one of an operation type, a service type of the service, address information of a terminal, a quality of service parameter, and a 5-tuple; and the operation type is quality of service detection of the service, and at least one of the address information of the terminal, the quality of service parameter, and the 5-tuple is used to indicate a service flow of the service; and determining, by the first network device, the first indication information based on at least one of the second indication information and the quality of service requirement, the local policy, and the local context that are of the service. Based on the solution, the first network device can obtain the first indication information.

According to a fourth aspect, a packet sending device is provided, and the packet sending device has a function of implementing the method in the first aspect. The function may be implemented by using hardware, or may be implemented by using hardware executing corresponding software. The hardware or the software includes one or more modules corresponding to the function.

According to a fifth aspect, a packet sending device is provided, including: a processor and a memory, where the memory is configured to store a computer-executable instruction, and when the packet sending device runs, the processor executes the computer-executable instruction stored in the memory, so that the packet sending device performs the method for detecting quality of service of a service according to any one the implementations of the first aspect.

According to a sixth aspect, a computer-readable storage medium is provided, where the computer-readable storage medium stores an instruction, and when the instruction is run on a computer, the computer is enabled to perform the method for detecting quality of service of a service according to any one of the implementations of the first aspect.

According to a seventh aspect, a computer program product including an instruction is provided. When the computer program product is run on a computer, the computer is enabled to perform the method for detecting quality of service of a service according to any one of the implementations of the first aspect.

According to an eighth aspect, a chip system is provided, where the chip system includes a processor configured to support a packet sending device in implementing a function in the foregoing aspects, for example, obtaining detection indication information. In a possible design, the chip system further includes a memory, where the memory is configured to store a program instruction and data that are necessary for the packet sending device. The chip system may include a chip, or may include a chip and another discrete component.

For technical effects brought by any one of the design manners of the fourth aspect to the eighth aspect, refer to technical effects brought by different design manners of the first aspect. Details are not described herein again.

According to a ninth aspect, a first network device is provided, and the first network device has a function of implementing the method in the second aspect. The function may be implemented by using hardware, or may be implemented by using hardware executing corresponding software. The hardware or the software includes one or more modules corresponding to the function.

According to a tenth aspect, a first network device is provided, including: a processor and a memory, where the memory is configured to store a computer-executable instruction, and when the first network device runs, the processor executes the computer-executable instruction stored in the memory, so that the first network device performs the method for detecting quality of service of a service according to any one the implementations of the second aspect.

According to an eleventh aspect, a computer-readable storage medium is provided, where the computer-readable storage medium stores an instruction, and when the instruction is run on a computer, the computer is enabled to perform the method for detecting quality of service of a service according to any one of the implementations of the second aspect.

According to a twelfth aspect, a computer program product including an instruction is provided, and when the computer program product is run on a computer, the computer is enabled to perform the method for detecting quality of service of a service according to any one of the implementations of the second aspect.

According to a thirteenth aspect, a chip system is provided, where the chip system includes a processor configured to support a first network device in implementing a function in the foregoing aspects, for example, obtaining first indication information. In a possible design, the chip system further includes a memory, where the memory is configured to store a program instruction and data that are necessary for the first network device. The chip system may include a chip, or may include a chip and another discrete component.

For technical effects brought by any one of the design manners of the ninth aspect to the thirteenth aspect, refer to technical effects brought by different design manners of the second aspect. Details are not described herein again.

According to a fourteenth aspect, a system for detecting quality of service of a service is provided, where the detecting system includes a packet sending device and a packet receiving device. The packet sending device is configured to obtain detection indication information, where the detection indication information is used to instruct the packet sending device to detect quality of service of a service. The packet sending device is further configured to send a detection packet to the packet receiving device based on the detection indication information, where the detection packet is used to detect the quality of service of the service. The packet receiving device is configured to: receive the detection packet from the packet receiving device, and determine the quality of service of the service based on the detection packet.

For technical effects brought by any one of the design manners of the fourteenth aspect, refer to technical effects brought by different design manners of the third aspect. Details are not described herein again.

These aspects or other aspects in this application may be clearer and intelligible in descriptions in the following embodiments.

DESCRIPTION OF EMBODIMENTS

For ease of understanding of technical solutions in embodiments of this application, the following first briefly describes technologies related to this application.

Service Flow:

A service flow in the embodiments of this application includes a service aggregation flow and a service subflow. In a 4th generation (4G) or 4.5th generation (4.5G) network, a service aggregation flow includes a bearer or a packet data network (PDN) connection, and a service subflow includes a specific service flow in the bearer. In a 5G network, a service aggregation flow includes a QoS flow or a protocol data unit (PDU) session, and a service subflow includes a specific service flow in the QoS flow.

Figure 2:
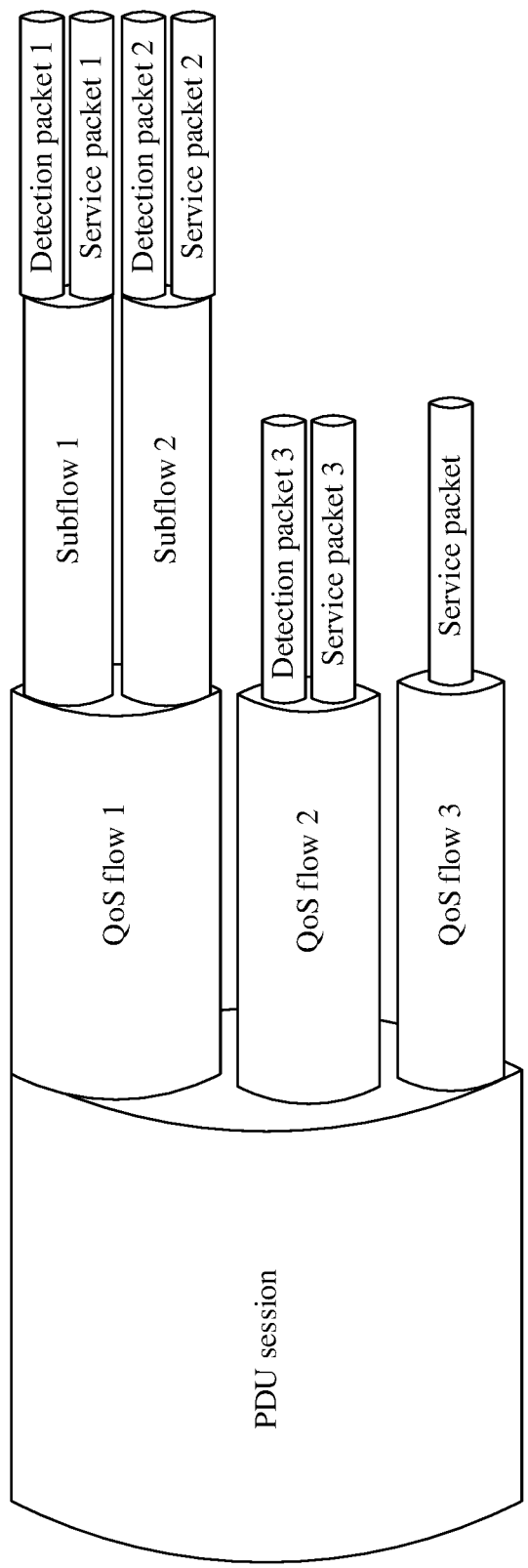
FIG. 2 is a schematic diagram of service flow distribution in a 5G network according to an embodiment of this application.

Using the 5G network as an example, as shown in FIG. 2, it is assumed that one PDU session includes three QoS flows: a QoS flow 1, a QoS flow 2, and a QoS flow 3. The QoS flow 1 includes a subflow 1 and a subflow 2. The subflow 1 and the subflow 2 each correspond to a different service flow. For example, the subflow 1 corresponds to a vehicle to everything communication (V2X) service flow 1, and the subflow 2 corresponds to a V2X service flow 2. In this case, the service aggregation flow in FIG. 2 includes the PDU session: the QoS flow 1, the QoS flow 2, and the QoS flow 3, and the service subflow includes the subflow 1 and the subflow 2. The service subflow or the service aggregation flow may be used to transmit a service packet and a detection packet. The service packet is specifically a user packet, namely, a packet transmitted by a terminal or an application server by using a mobile network to perform a service; and the detection packet is specifically a packet, inside the mobile network, used to detect quality of service of a service. The detection packet is constructed by a packet sending device, and the packet sending device may be a terminal, an access device, or a UPF entity in the 5G network, or may be a terminal, an access device, or a gateway user plane function (GW-U) entity in the 4.5G network, or may be a terminal, an access device, or a gateway (GW) in the 4G network, or the like. This is not specifically limited in the embodiments of this application. The following describes packet formats of the service packet and the detection packet.

Figure 3:
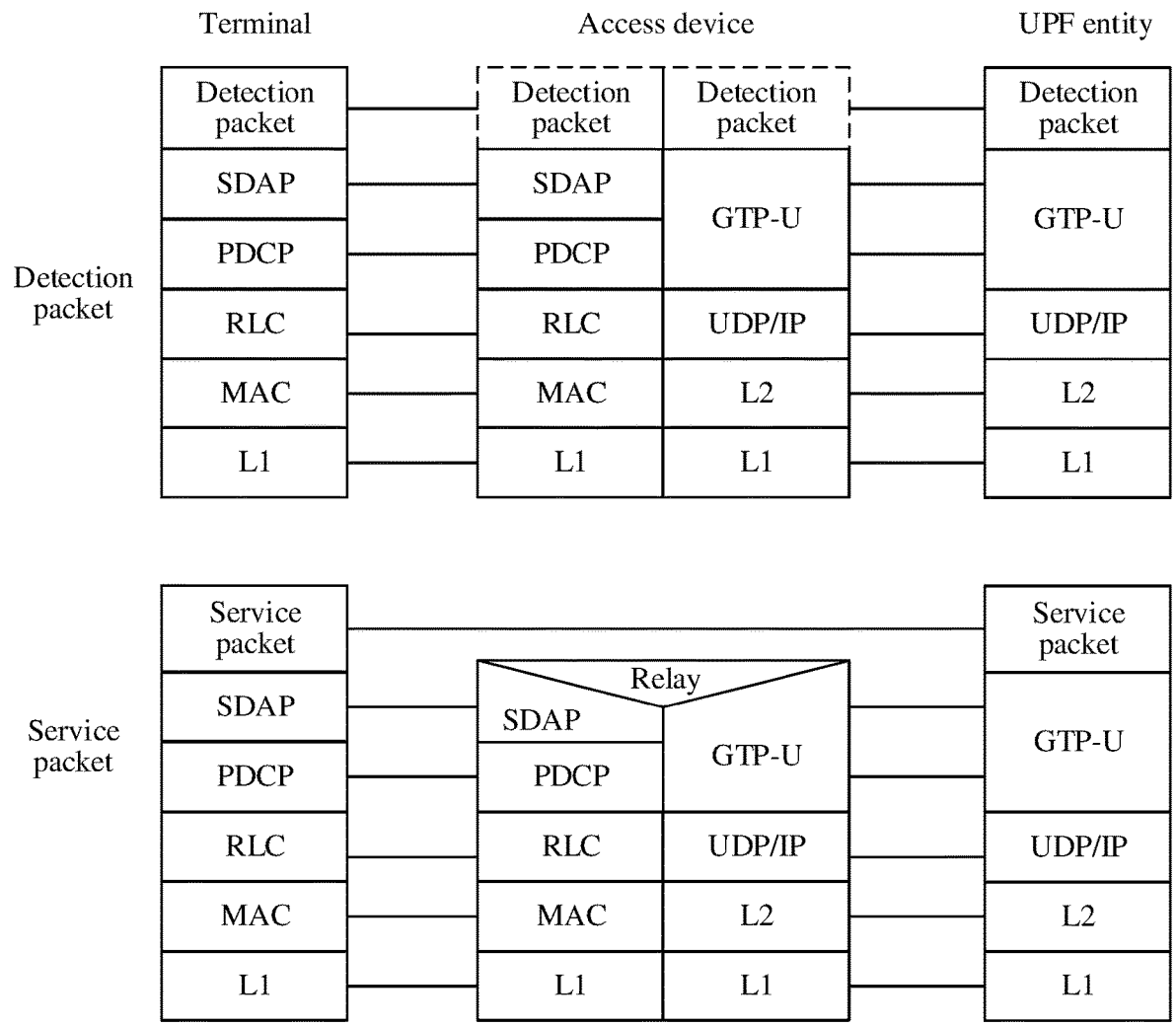
FIG. 3 is a schematic structural diagram of a protocol stack of a 3GPP network protocol header according to an embodiment of this application.

Packet Format:

In the embodiments of this application, the detection packet and the service packet use a same 3GPP network protocol header. A main difference between the detection packet and the service packet lies in that a load type of the detection packet is the detection packet, and a load type of the service packet is the service packet. Using the 5G network as an example, the 3GPP network protocol header corresponds to a protocol stack in FIG. 3. It can be seen from FIG. 3 that, a 3GPP network protocol header between a terminal and an access device includes a service data adaptation protocol (SDAP) header, a packet data convergence protocol (PDCP) header, and a lower protocol layer header. The lower protocol layer header includes a radio link control (RLC) layer, a media access control (MAC) layer, and a layer 1 (L1). A 3GPP network protocol header between the access device and a UPF entity includes a user plane general packet radio service technology (GPRS) tunneling protocol (GTP-U) header and a lower protocol layer header. The lower protocol layer header includes a user datagram protocol (UDP) or an internet protocol (IP) layer, a layer 2 (L2), and an L1. Because a same network protocol header can ensure that the detection packet and the corresponding service packet use a same end-to-end pipeline resource, the quality of service of the service can be detected by using the detection packet. In the embodiments of this application, the service packet corresponding to the detection packet is a service packet that corresponds to a same service flow as the detection packet. For example, in FIG. 2, a service packet corresponding to a detection packet 1 is a service packet 1, and a service packet corresponding to a detection packet 2 is a service packet 2, a service packet corresponding to a detection packet 3 is a service packet 3, and so on.

Optionally, the detection packet in the embodiments of this application may also be defined as a link quality awareness protocol (LQAP) packet, or may be defined as another packet. This is not specifically limited in the embodiments of this application.

Detection Type:

The detection type in the embodiments of this application includes three detection types: link connectivity detection, service transmission performance detection, and loopback (LB) detection. The following briefly describes the three detection types separately.

Link Connectivity Detection

According to the link connectivity detection, a detection packet is periodically sent by the packet sending device, and a packet receiving device determines, based on an arrival status of the detection packet, whether a fault occurs on a link. The sending period is mainly determined based on factors such as a delay. For example, if a 6 ms end-to-end delay is required for packet transmission, the sending period may be determined to be 2 ms. If the packet receiving device receives no detection packet in three consecutive periods, it may be considered that the link is faulty, that is, an interval between a time at which a detection packet arrives and a time at which an adjacent detection packet arrives does not meet a quality of service requirement of a service already.

In the embodiments of this application, the packet receiving device may be a terminal, an access device, or a UPF entity in the 5G network, or may be a terminal, an access device, or a GW-U entity in the 4.5G network, or may be a terminal, an access device, or a GW in the 4G network, or the like. This is not specifically limited in the embodiments of this application. For related descriptions of the packet sending device, refer to the foregoing embodiment. Details are not described herein again.

When the link connectivity detection is performed, parameters required by the packet sending device include a service flow identifier and a sending period. The service flow identifier is used to indicate a service flow of a service, and the sending period is a time interval between a time of sending a detection packet and a time of sending an adjacent packet.

Optionally, in the embodiments of this application, in the 5G network, if the service flow is a PDU session, a service flow identifier may be a PDU session identifier (ID) or address information of a terminal, to be specific, a PDU session of the terminal may be determined based on the PDU session identifier or the address information of the terminal; if the service flow is a QoS flow, a service flow identifier may be a PDU session identifier and a QoS flow identifier (QFI), to be specific, a QoS flow in a PDU session of a terminal may be determined based on the PDU session identifier or the QFI; or if the service flow is a specific service flow in a QoS flow, a service flow identifier may be a 5-tuple or other address information that can uniquely determine the specific service flow in the QoS flow, for example, a source MAC address and a destination MAC address, to be specific, a specific service flow in a QoS flow in a PDU session of a terminal may be determined based on the 5-tuple or the other address information that can uniquely determine the specific service flow in the QoS flow, where the 5-tuple includes a source IP address, a destination IP address, a source port number, a destination port number, and a transport layer protocol number. In the 4G or 4.5G network, if the service flow is a PDN connection, a service flow identifier may include a PDN connection identifier, to be specific, a PDN connection of a terminal may be determined based on the PDN connection identifier; if the service flow is a carrier, a service flow identifier may be a PDN connection identifier and a carrier identifier. In other words, a carrier in a PDN connection of a terminal may be determined based on the PDN connection identifier and the carrier identifier; or if the service flow is a specific service flow in a bearer, a service flow identifier may be the foregoing 5-tuple, to be specific, a specific service flow may be uniquely determined based on the 5-tuple. Descriptions are provided herein, and details are not described below again.

Optionally, the parameters required by the packet sending device may further include at least one of a context identifier of the detection packet and a detection type. The detection type is used to indicate that a type of quality of service detection of the service is the link connectivity detection. The context identifier of the detection packet is used to indicate a local context of the detection packet. When the link connectivity detection is performed, the local context of the detection packet of the packet sending device may specifically include at least one of the sending period of the detection packet, the detection type, the context identifier of the detection packet, and the service flow identifier. Descriptions are provided herein, and details are not described below again.

When the link connectivity detection is performed, parameters required by the packet receiving device include the service flow identifier, a receiving period, and a fault decision threshold. The service flow identifier is used to indicate the service flow of the service, the receiving period is a time interval between a time of receiving a detection packet and a time of receiving an adjacent detection packet, and the fault decision threshold is used to determine a fault. For example, a 6 ms end-to-end delay is required for packet transmission, and if the receiving period is 2 ms, the fault decision threshold herein should be set to 3. If the packet receiving device does not receive a detection packet in three consecutive periods, it may be considered that a link is faulty. When the quality of service of the service is detected, the parameters required by the packet receiving device and the parameters required by the packet sending device include the same service flow identifier, and the sending period is the same as the receiving period. Descriptions are provided herein, and details are not described below again.

Optionally, the parameters required by the packet receiving device may further include at least one of the context identifier of the detection packet, the detection type, and an action after a fault. For example, the action after a fault may be initiating the loopback detection to locate the fault, or reporting the fault to a control plane. This is not specifically limited in the embodiments of this application. The context identifier of the detection packet is used to indicate the local context of the detection packet. When the link connectivity detection is performed, the local context of the detection packet of the packet receiving device may specifically include at least one of the receiving period of the detection packet, the fault decision threshold, the detection type, the context identifier of the detection packet, the service flow identifier, and the action corresponding to the fault. Descriptions are provided herein, and details are not described below again.

Optionally, when the link connectivity detection is performed, there may be an intermediate device between the packet sending device and the packet receiving device. For example, in the 5G network, if the packet sending device is a terminal, and the packet receiving device is a UPF entity, the intermediate device may be, for example, an access device. Parameters required by the intermediate device include at least one of the context identifier of the detection packet, the detection type, a processing manner, the fault decision threshold, and the action corresponding to the fault. The processing manner includes performing transparent transmission or modifying the receiving period, and the receiving period is to the same as the sending period. The quality of service of the service may also be detected by using the intermediate device. This is not specifically limited in the embodiments of this application.

When the link connectivity detection is performed, the parameters required by the packet receiving device, the parameters required by the intermediate device, and the parameters required by the packet sending device may further include another parameter. This is not specifically limited in the embodiments of this application.

Service Transmission Performance Detection

Service transmission performance detection is mainly used to detect service transmission performance of the service flow, for example, a packet loss rate or a jitter. A basic principle of the service transmission performance detection is that the packet sending device and the packet receiving device exchange statistical information, to calculate the packet loss rate or the jitter.

When the service transmission performance detection is performed, the parameters required by the packet sending device include the service flow identifier and the sending period. The sending period may be time-based. For example, a detection packet is sent every two seconds. Alternatively, the sending period may be based on a data volume. For example, each time the packet sending device sends a 1-M service packet, the packet sending device may send a detection packet once to send statistical data of the service packet once.

Optionally, the parameters required by the packet sending device may further include at least one of the context identifier of the detection packet and the detection type. The detection type is used to indicate that the type of quality of service detection of the service is the service transmission performance detection. The context identifier of the detection packet is used to indicate the local context of the detection packet. When the service transmission performance detection is performed, the local context of the detection packet of the packet sending device may specifically include at least one of the service flow identifier, the sending period of the detection packet, the context identifier of the detection packet, and the detection type. Descriptions are provided herein, and details are not described below again.

When the service transmission performance detection is performed, the parameters required by the packet receiving device include the service flow identifier and a transmission performance threshold. The transmission performance threshold is used to determine transmission performance, and the transmission performance threshold may be, for example, a packet loss rate threshold or a jitter threshold. For example, if the packet loss rate threshold is 0.5%, when the packet receiving device determines that a current packet loss rate is 0.5% or exceeds 0.5%, it may be considered that the service transmission performance does not meet a requirement. Alternatively, for example, if the jitter threshold is 2 ms, when the packet receiving device determines that a current jitter value is 2 ms or exceeds 2 ms, it may be considered that the service transmission performance does not meet a requirement.

In addition, the parameters required by the packet receiving device may further include at least one of the context identifier of the detection packet, the detection type, and an action corresponding to a fault. The action corresponding to the fault may be initiating the loopback detection to locate the fault, or reporting the fault to the control plane. This is not specifically limited in the embodiments of this application. The context identifier of the detection packet is used to indicate the local context of the detection packet. When the service transmission performance detection is performed, the local context of the detection packet of the packet receiving device may specifically include at least one of the service flow identifier, the transmission performance threshold, the context identifier of the detection packet, the detection type, and the action corresponding to the fault. Descriptions are provided herein, and details are not described below again.

When the service transmission performance detection is performed, the parameters required by the packet receiving device and the parameters required by the packet sending device may further include another parameter. This is not specifically limited in the embodiments of this application.

Loopback Detection

The loopback detection is mainly used to detect a loopback delay of the service flow and locate a fault. A basic principle of the loop detection is that a packet transceiver device (which is both a packet sending device and a packet receiving device) sends a detection packet, to measure the loopback delay and locate a fault. A major difference of the loopback detection from the link connectivity detection and the service transmission performance detection lies in that a loopback device exists in the loopback detection, and a function of the loopback device is to return the detection packet in an original path.

When the loopback detection is performed, parameters required by the packet transceiver device include the service flow identifier, loopback path length information, and the context identifier of the detection packet. The loopback path length information is used to locate the fault, and the context identifier of the detection packet is used to indicate the local context of the detection packet. When the loopback detection is performed, the local context of the detection packet of the packet transceiver device may specifically include at least one of the service flow identifier, the loopback path length information, and the context identifier of the detection packet. Descriptions are provided herein, and details are not described below again.

Parameters required by the loopback device include the service flow identifier.

tion packet is 2. If the base station does not include the context corresponding to the context identifier of the detection packet, the base station considers the detection packet as a common service packet and transmits the detection packet to the UPF entity. Because the UPF entity includes the context corresponding to the context identifier of the detection packet, it may be determined, based on the context of the detection packet, that the UPF entity is the loopback device, and further, the UPF entity may loop the detection packet back to the terminal. Because the terminal learns a segment loopback delay and the end-to-end delay, if a segment of the path is faulty, the fault can be detected through the loopback detection.

When the loopback detection is performed, the parameters required by the packet transceiver device and the parameters required by the loopback device may further include another parameter. This is not specifically limited in the embodiments of this application.

The following provides a comparison between the foregoing three detection types, as shown in Table 1.

TABLE 1

| Detection type | Parameters required by the packet sending device or parameters required by the packet transceiver device | Parameters required by the intermediate device (optional) | Parameters required by the packet receiving device or parameters required by the loopback device |
|---|---|---|---|
| Link connectivity detection | Service flow identifier, the sending period, the context identifier of the detection packet (optional), and the detection type (optional) | Context identifier of the detection packet (optional), the detection type (optional), the processing manner (optional), the fault decision threshold (optional), or the action corresponding to the fault (optional) | Service flow identifier, the receiving period, the fault decision threshold, the detection type (optional), the context identifier of the detection packet (optional), and the action corresponding to the fault (optional) |
| Service transmission performance detection | Service flow identifier, the sending period, the context identifier of the detection packet (optional), and the detection type (optional) | N/A | Service flow identifier, the transmission performance threshold, the detection type (optional), the context identifier of the detection packet (optional), and the action corresponding to the fault (optional) |
| Loopback detection | Service flow identifier, the loopback path length information, and the context identifier of the detection packet | N/A | Service flow identifier, and the context identifier of the detection packet (optional) |

Optionally, the parameters required by the loopback device may further include the context identifier of the detection packet. The context identifier of the detection packet is used to indicate the local context of the detection packet. When the loopback detection is performed, the local context of the detection packet of the loopback device may specifically include at least one of the service flow identifier or the context identifier of the detection packet. Descriptions are provided herein, and details are not described below again.

Figure 4:
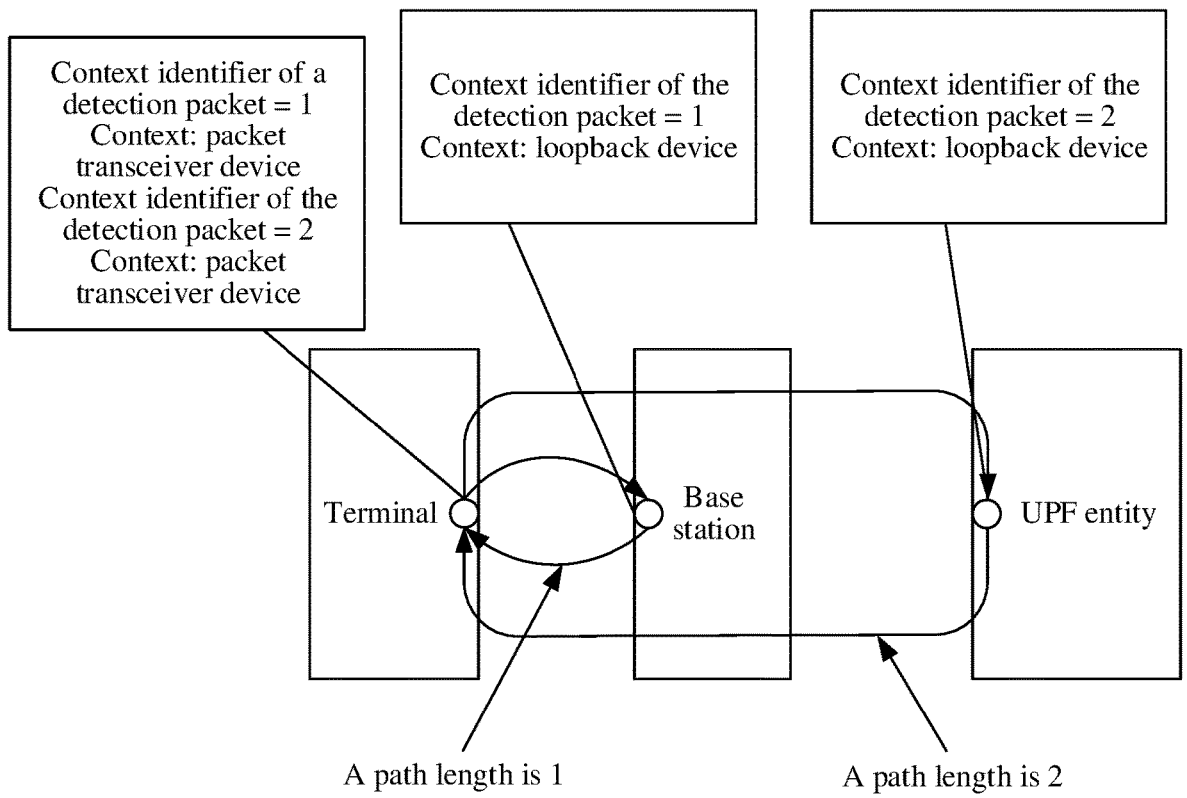
FIG. 4 is a schematic diagram of loopback detection according to an embodiment of this application.

For example, FIG. 4 is a schematic diagram of loopback detection according to the embodiments of this application. A terminal initiates the loopback detection, and the context identifier of the detection packet is 1. If a base station includes a context corresponding to the context identifier of the detection packet, it may be determined, based on the context of the detection packet, that the base station is the loopback device, and further, the base station may loop the detection packet back to the terminal. After receiving the detection packet, the terminal may continue to initiate the loopback detection, and the context identifier of the detec- It should be noted that, this application provides only several examples of detection types of quality of service detection of the service and there may be another detection type. This is not specifically limited in the embodiments of this application.

The following describes the technical solutions in the embodiments of this application with reference to the accompanying drawings in the embodiments of this application. In description of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "plurality of" means two or more than two unless otherwise specified. In addition, to clearly describe the technical solutions in the embodiments of this application, the terms such as "first" and "second" are used in the embodiments of this application to distinguish between same items or similar items that have basically same functions and purposes. A person skilled in the art may understand that the terms such as "first" and "second" do not limit a quantity or an execution sequence and the terms such as "first" and "second" do not indicate a definite difference.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with the evolution of the network architecture and the emergence of a new service scenario, the technical solutions provided in the embodiments of this application are also applicable to a similar technical problem.

Figure 5:
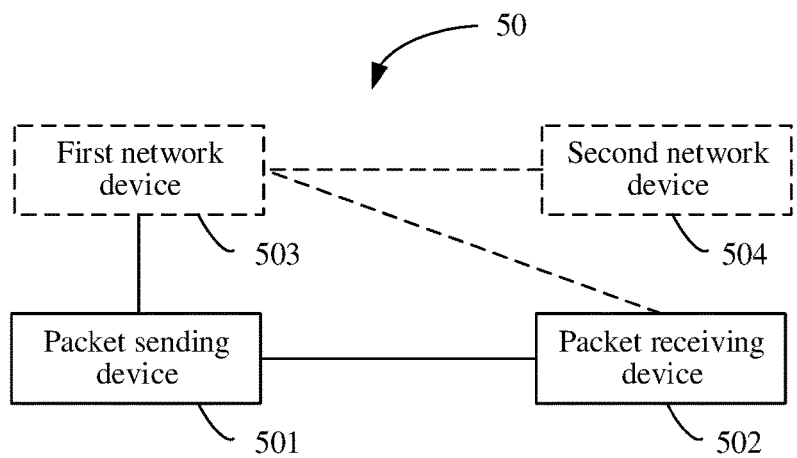
FIG. 5 is a schematic architectural diagram of a system for detecting quality of service of a service according to an embodiment of this application.

FIG. 5 shows a system 50 for detecting quality of service of a service according to an embodiment of this application. The system for detecting quality of service of a service includes a packet sending device 501 and a packet receiving device 502.

The packet sending device 501 is configured to obtain detection indication information, where the detection indication information is used to instruct the packet sending device to detect quality of service of a service.

The packet sending device 501 is further configured to send a detection packet to the packet receiving device 502 based on the detection indication information. The detection packet is used to detect the quality of service of the service.

The packet receiving device 502 is configured to: receive the detection packet from the packet sending device 501, and determine the quality of service of the service based on the detection packet.

For related descriptions of a service flow and a service flow identifier, refer to the foregoing embodiment. Details are not described herein again.

Optionally, in this embodiment of this application, the packet sending device 501 and the packet receiving device 502 may directly communicate with each other, or may communicate with each other through forwarding by another device. This is not specifically limited in this embodiment of this application.

Optionally, in this embodiment of this application, the packet sending device 501 and the packet receiving device 502 may be integrated into a packet transceiver device. For example, when loopback detection is performed, the packet sending device and the packet receiving device are integrated into the packet transceiver device. This is not specifically limited in this embodiment of this application.

Based on the system for detecting quality of service of a service provided in this embodiment of this application, the packet sending device can obtain the detection indication information, and send the detection packet to the packet receiving device based on the detection indication information. After receiving the detection packet from the packet sending device, the packet receiving device can determine the quality of service of the service based on the detection packet. Therefore, based on the solution, the quality of service of the service can be detected.

That the packet sending device 501 is configured to obtain detection indication information may specifically include: The packet sending device 501 is configured to determine the detection indication information based on at least one of a quality of service requirement, a local policy, and a local context that are of the service. The following method embodiment gives detailed descriptions of a specific implementation of determining, by the packet sending device, the detection indication information based on at least one of the quality of service requirement, the local policy, and the local context that are of the service. Details are not described herein again.

Alternatively, optionally, that the packet sending device is configured to obtain detection indication information may specifically include: The packet sending device 501 is configured to receive the detection indication information from the packet receiving device 502.

Alternatively, optionally, that the packet sending device 501 is configured to obtain detection indication information may specifically include: The packet sending device 501 is configured to: receive first indication information from the packet receiving device 502, and determine the detection indication information based on at least one of the first indication information and the quality of service requirement, the local policy, and the local context that are of the service. The first indication information is used to instruct the packet sending device to detect the quality of service of the service. The following method embodiment gives detailed descriptions of a specific implementation of determining, by the packet sending device, the detection indication information based on at least one of the first indication information and the quality of service requirement, the local policy, and the local context that are of the service. Details are not described herein again.

Alternatively, optionally, as shown in FIG. 5, the system 50 for detecting quality of service of a service according to this embodiment of this application may further include a first network device 503.

The first network device 503 is configured to: obtain first indication information, and send the first indication information to the packet sending device 501. The first indication information is used to instruct the packet sending device 501 to detect the quality of service of the service.

Further, that the packet sending device 501 is configured to obtain detection indication information may specifically include: The packet sending device 501 is configured to: receive the first indication information from the first network device 503, and determine the first indication information as the detection indication information. In other words, the first indication information is the same as the detection indication information in this case.

Alternatively, optionally, that the packet sending device 501 is configured to obtain detection indication information may specifically include: The packet sending device 501 is configured to: receive the first indication information from the first network device 503, and determine the detection indication information based on at least one of the first indication information and the quality of service requirement, the local policy, and the local context that are of the service.

That the first network device 503 is configured to obtain first indication information includes: The first network device determines the first indication information based on at least one of the quality of service requirement, the local policy, and the local context that are of the service. The following method embodiment gives detailed descriptions of a specific implementation of determining, by the first network device, the first indication information based on at least one of the quality of service requirement, the local policy, and the local context that are of the service. Details are not described herein again.

Alternatively, optionally, as shown in FIG. 5, the system 50 for detecting quality of service of a service according to this embodiment of this application may further include a second network device 504.

The second network device 504 is configured to send second indication information to the first network device 503. The second indication information includes at least one of an operation type, address information of a terminal, a quality of service parameter, and a 5-tuple. The operation type is quality of service detection of the service, and at least one of the address information of the terminal, the quality of service parameter, and the 5-tuple is used to indicate a service flow of the service.

Further, that the first network device 503 is configured to obtain first indication information may specifically include: The first network device 503 is configured to: receive the second indication information from the second network device 504, and determine the second indication information as the first indication information. In other words, the first indication information is the same as the second indication information in this case.

Alternatively, optionally, that the first network device 503 is configured to obtain first indication information may specifically include: The first network device 503 is configured to: receive the second indication information from the second network device 504, and determine the first indication information based on at least one of the second indication information and the quality of service requirement, the local policy, and the local context that are of the service. The following method embodiment gives detailed descriptions of a specific implementation of determining, by the first network device, the first indication information based on at least one of the second indication information and the quality of service requirement, the local policy, and the local context that are of the service. Details are not described herein again.

Optionally, in this embodiment of this application, the first network device 503 and the packet sending device 501 may directly communicate with each other, or may communicate with each other through forwarding by another device. This is not specifically limited in this embodiment of this application.

Optionally, in this embodiment of this application, the first network device 503 and the second network device 504 may directly communicate with each other, or may communicate with each other through forwarding by another device. This is not specifically limited in this embodiment of this application.

The first network device 503 may also communicate with the packet receiving device 503, for example, send a parameter required by the packet receiving device to the packet receiving device 503. This is not specifically limited in this embodiment of this application.

Figure 1:
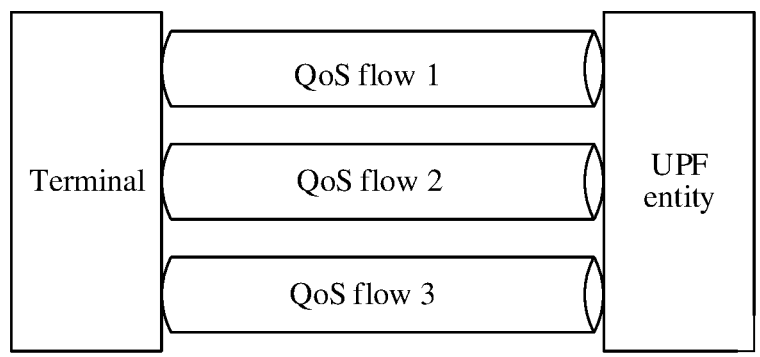
FIG. 1 is a schematic diagram of connections between devices in a URLLC scenario in an existing 5G network.

Optionally, the system 50 for detecting quality of service of a service shown in FIG. 1 may be applied to a current 4G network and 4.5G network, a future 5G network, and another future network. This is not specifically limited in this embodiment of the present disclosure.

Figure 6:
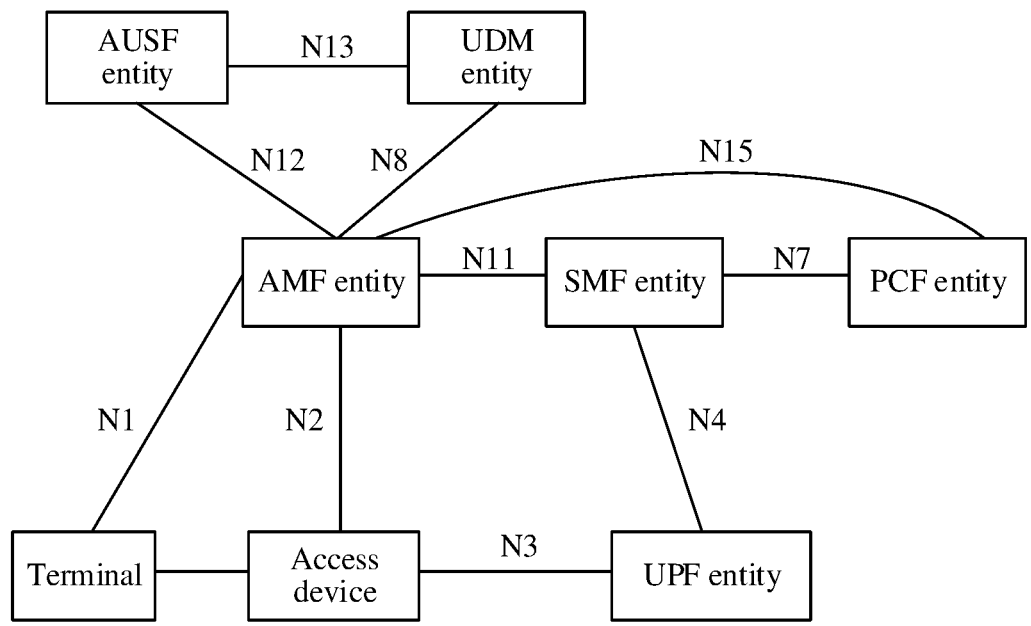
FIG. 6 is a schematic diagram of a 5G network architecture according to an embodiment of this application.

If the system 50 for detecting quality of service of a service is applied to the future 5G network, as shown in FIG. 6, the packet sending device 501 may be a terminal in the 5G network, and the packet receiving device 502 may be an access device or a UPF entity in the 5G network; or the packet sending device 501 may be an access device in the 5G network, and the packet receiving device 502 may be a terminal or a UPF entity in the 5G network; or the packet sending device 501 may be a UPF entity in the 5G network, and the packet receiving device 502 may be a terminal or an access device in the 5G network; and the first network device 503 may be a session management function (SMF) entity in the 5G network, and the second network device 504 may be a policy control function (PCF) entity in the 5G network.

In addition, as shown in FIG. 6, the 5G network may further include a unified data management (DM) entity, an authentication server function (AUSF) entity, an access and mobility management function (AMF) entity, and the like. This is not specifically limited in this embodiment of this application.

The terminal communicates with the AMF entity through a next generation network (N) interface 1 (N1), the access device communicates with the AMF entity through an N interface 2 (N2), the access device communicates with the UPF entity through an N interface 3 (N3), the AMF entity communicates with the SMF entity through an N interface 11 (N11), the AMF entity communicates with the UDM entity through an N interface 8 (N8), the AMF entity communicates with the AUSF entity through an N interface 12 (N12), the AMF entity communicates with the PCF entity through an N interface 15 (N15), the SMF entity communicates with the PCF entity through an N interface 7 (N7), and the SMF entity communicates with the UPF entity through an N interface 4 (N4).

In addition, the UDM entity, the AUSF entity, the PCF entity, the AMF entity, and the SMF entity in FIG. 6 may also be collectively referred to as a control plane function (CPF) entity. This is not specifically limited in this embodiment of this application.

It should be noted that names of interfaces between various network elements in FIG. 6 are merely examples, and the interfaces may have other names during specific implementation. This is not specifically limited in this embodiment of this application.

It should be noted that the access device, the AMF entity, the SMF entity, the AUSF entity, the UDM entity, the UPF entity, the PCF entity, and the like in FIG. 6 are merely names, and the names constitute no limitation on the devices. In the 5G network and the another further network, network elements or entities corresponding to the access device, the AMF entity, the SMF entity, the AUSF entity, the UDM entity, the UPF entity, and the PCF entity may have other names. This is not specifically limited in this embodiment of this application. For example, the UDM entity may be replaced with a home subscriber server (HSS), a user subscription database (USD) entity, or a database entity. Descriptions are provided herein, and details are not described below again.

Figure 7:
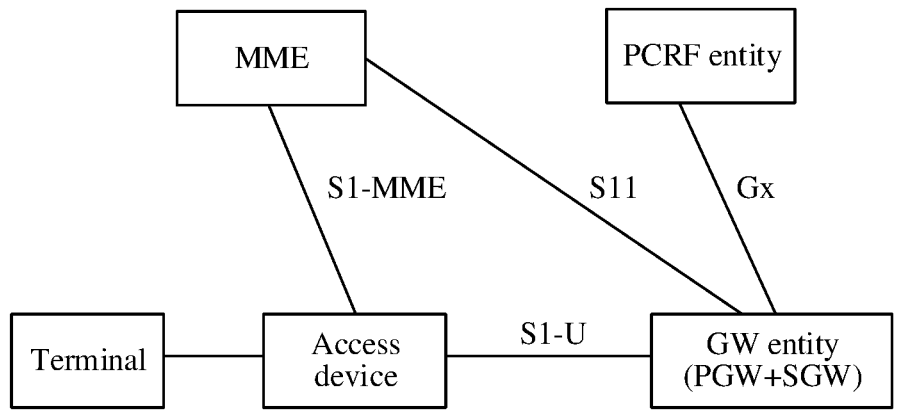
FIG. 7 is a schematic diagram of a 4G network architecture according to an embodiment of this application.

Optionally, if the system 50 for detecting quality of service of a service is applied to the current 4G network, as shown in FIG. 7, the packet sending device 501 may be a terminal in the 4G network, and the packet receiving device 502 may be an access device or a GW entity in the 4G network; or the packet sending device 501 may be an access device in the 4G network, and the packet receiving device 502 may be a terminal or a GW entity in the 4G network; or the packet sending device 501 may be a GW entity in the 4G network, and the packet receiving device 502 may be a terminal or an access device in the 4G network; and the first network device 503 may be a GW in the 4G network, and the second network device 504 may be a policy and charging rules function (PCRF) entity in the 4G network. The GW integrates functions of a PDN gateway (PGW) and a serving gateway (SGW).

In addition, as shown in FIG. 7, the 4G network may further include a mobility management entity (MME), and the like. For details, refer to an existing 4G network architecture. Details are not described in this embodiment of this application.

The access device communicates with the GW by using an S1-U interface, the access device communicates with the MME by using an S1-MME interface, the MME communicates with the GW by using an S11 interface, and the PCRF entity communicates with the GW by using a Gx interface.

Figure 8:
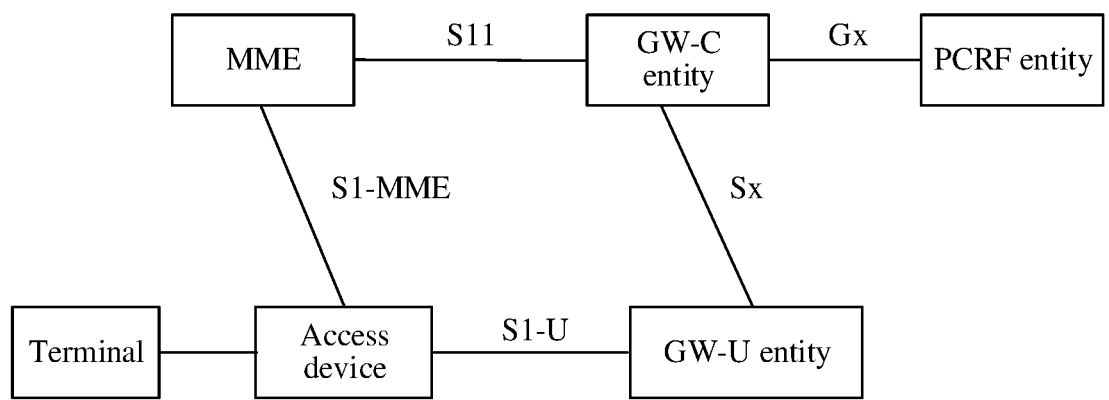
FIG. 8 is a schematic diagram of a 4.5G network architecture according to an embodiment of this application.

Optionally, if the system 50 for detecting quality of service of a service is applied to the current 4.5G network, as shown in FIG. 8, the packet sending device 501 may be a terminal in the 4.5G network, and the packet receiving device 502 may be an access device or a GW-U entity in the 4.5G network; or the packet sending device 501 may be an access device in the 4.5G network, and the packet receiving device 502 may be a terminal or a GW-U entity in the 4.5G network; or the packet sending device 501 may be a GW-U entity in the 4.5G network, and the packet receiving device 502 may be a terminal or an access device in the 4.5G network; and the first network device 503 may be a GW-U entity in the 4.5G network, and the second network device 504 may be a PCRF entity in the 4.5G network.

In addition, as shown in FIG. 8, the 4.5G network may further include an MME, and the like. For details, refer to an existing 4.5G network architecture. Details are not described in this embodiment of this application.

The access device communicates with the GW-U entity through an S1-U interface, the access device communicates with the MME through an S1-MME interface, the MME communicates with the GW-C entity through an S11 interface, the GW-C entity communicates with the GW-U entity through an Sx interface, and the PCRF entity communicates with the GW-C entity through a Gx interface.

Optionally, the terminal in this embodiment of this application may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, and the like. For ease of description, the devices mentioned above are collectively referred to as a terminal in this application.

Optionally, the access device in this embodiment of this application is a device that accesses a core network, for example, a base station, a broadband network gateway (BNG), an aggregation switch, or a non-3rd generation partnership project (3GPP) access device. The base station may include various forms of base stations, for example, a macro base station, a micro base station (also referred to as a small cell), a relay station, and an access point.

Optionally, the packet sending device 501, the packet receiving device 502, the first network device 503, and the second network device 504 in FIG. 5 may be implemented by one physical device, or may be jointly implemented by a plurality of physical devices, or may be a logical function module in one physical device. This is not specifically limited in this embodiment of this application.

Figure 9:
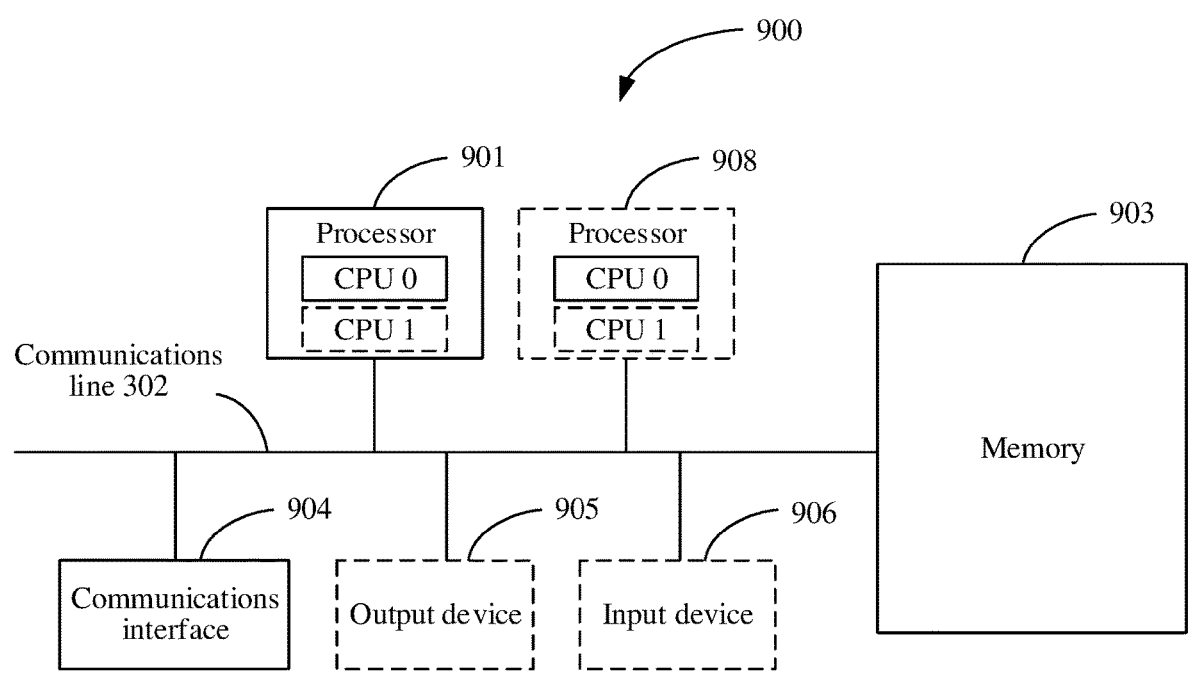
FIG. 9 is a schematic diagram of a hardware structure of a communications device according to an embodiment of this application.

For example, the packet sending device 501, the packet receiving device 502, the first network device 503, and the second network device 504 in FIG. 1 may be implemented by using a communications device in FIG. 9. FIG. 9 is a schematic diagram of a hardware structure of the communications device according to an embodiment of this application. The communications device 900 includes at least one processor 901, a communications line 902, a memory 903, and at least one communications interface 904.

The processor 901 may be a general-purpose central processing unit (CPU), a microprocessor, an application-specific integrated circuit (ASIC), or one or more integrated circuits for controlling program execution of the solutions in this application.

The communications line 902 may include a path through which information is transmitted between the foregoing components.

The communications interface 904 is any apparatus such as a transceiver, to communicate with another device or communications network such as the Ethernet, a radio access network (RAN), or a wireless local area network (WLAN).

The memory 903 may be a read-only memory (ROM) or another type of static storage device that can store static information and instructions, a random access memory (RAM), or another type of dynamic storage device that can store information and instructions; or may be an electrically erasable programmable read-only memory (EEPROM), a compact disc read-only memory (CD-ROM), or another compact disc storage, optical disc storage (including a compact disc, a laser disc, an optical disc, a digital versatile disc, a Blu-ray disc, or the like), a disk storage medium or another disk storage device, or any other medium that can be used to carry or store expected program code in a form of an instruction or data structure and that can be accessed by a computer. However, the memory 903 is not limited herein. The memory may exist independently, and is connected to the processor by using the communications line 902. The memory may be integrated with the processor.

The memory 903 is configured to store a computer-executable instruction for performing the solutions in this application, and the computer-executable instruction is executed under control of the processor 901. The processor 901 is configured to execute the computer-executable instruction stored in the memory 903, to implement a method for detecting quality of service of a service provided in the following embodiment of this application.

Optionally, the computer-executable instruction in this embodiment of this application may also be referred to as application code. This is not specifically limited in this embodiment of this application.

During specific implementation, in an embodiment, the processor 901 may include one or more CPUs, for example, a CPU 0 and a CPU 1 in FIG. 9.

During specific implementation, in an embodiment, the communications device 900 may include a plurality of processors, for example, the processor 901 and a processor 908 in FIG. 9. Each of the processors may be a single-core (single-CPU) processor, or may be a multi-core (multi-CPU) processor. The processors herein may be one or more devices, circuits, and/or processing cores configured to process data (for example, a computer program instruction).

During specific implementation, in an embodiment, the communications device 900 may further include an output device 905 and an input device 906. The output device 905 communicates with the processor 901, and may display information in a plurality of manners. For example, the output device 905 may be a liquid crystal display (LCD), a light emitting diode (LED) display device, a cathode ray tube (CRT) display device, or a projector. The input device 906 communicates with the processor 901, and may receive input of a user in a plurality of manners. For example, the input device 906 may be a mouse, a keyboard, a touchscreen device, or a sensing device.

The communications device 900 may be a general-purpose device or a special-purpose device. During specific implementation, the communications device 900 may be a desktop computer, a portable computer, a network server, a palmtop computer (PDA), a mobile phone, a tablet computer, a wireless terminal device, an embedded device, or a device with a structure similar to that in FIG. 9. A type of the communications device 900 is not limited in this embodiment of this application.

The following describes in detail the method for detecting quality of service of a service provided in an embodiment of this application with reference to FIG. 1 to FIG. 9.

Figure 10:
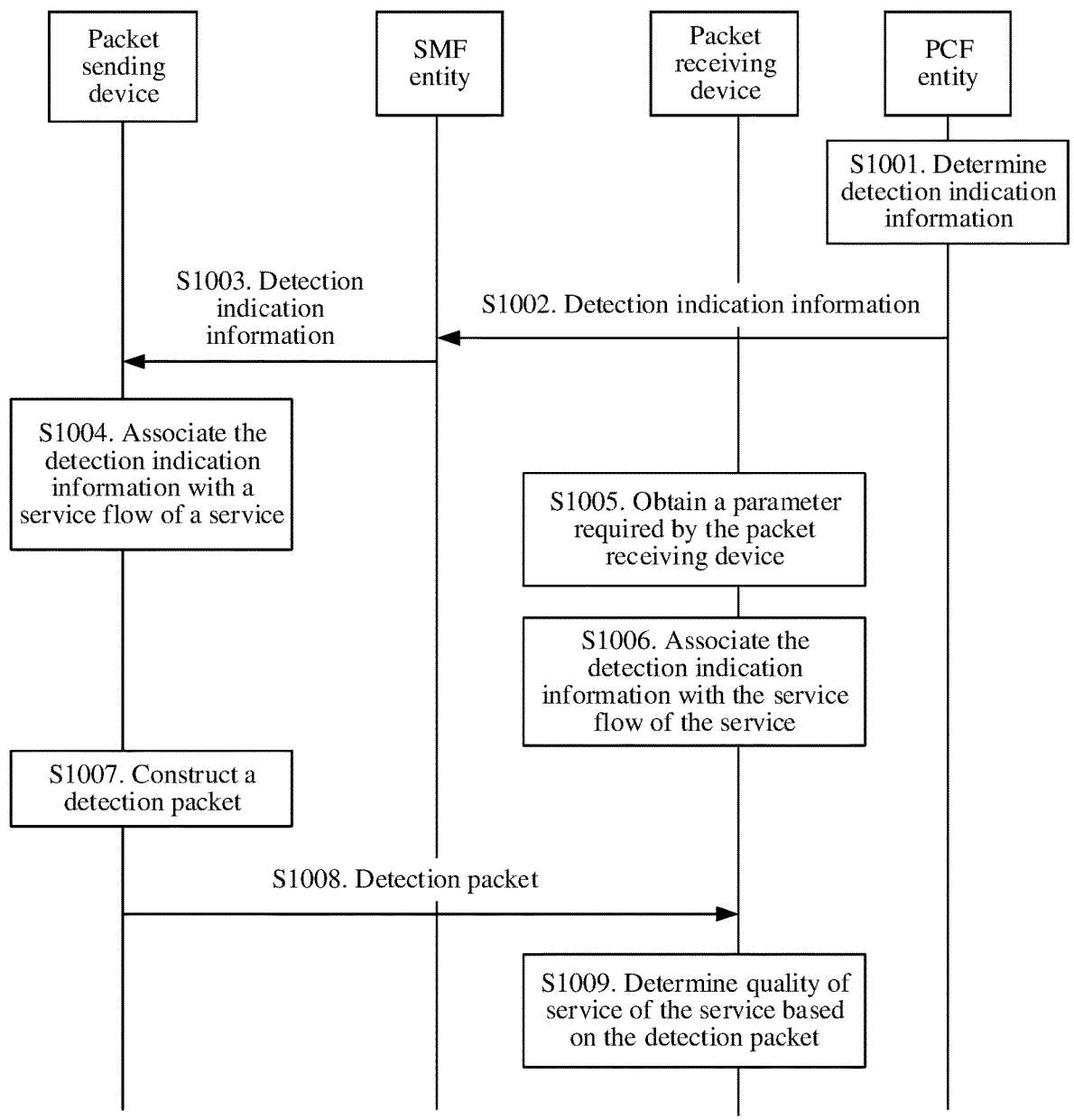
FIG. 10 is a schematic flowchart 1 of a method for detecting quality of service of a service according to an embodiment of this application.

For example, the system 50 for detecting quality of service of a service shown in FIG. 5 is applied to the 5G network shown in FIG. 6. FIG. 10 shows the method for detecting quality of service of a service according to this embodiment of this application. The method includes the following steps.

S1001. A PCF entity determines detection indication information, where the detection indication information is used to instruct a packet sending device to detect quality of service of a service.

Optionally, the detection indication information in this embodiment of this application may include a service flow identifier or a service type of the service. For related description of the service flow identifier, refer to the foregoing embodiment. Details are not described herein again.

Optionally, the service type in this embodiment of this application may include a URLLC service, or a vehicle to everything communication (V2X) service in the URLLC service, a vehicle to infrastructure communication (V2I) service, a vehicle to vehicle (V2V) service, an augmented reality (AR) service, a virtual reality service, or the like. This is not specifically limited in this embodiment of this application.

Optionally, in this embodiment of this application, a field of the service type may be directly defined, or the service type may be represented by using a QoS parameter, for example, by using a 5G QoS indicator (5QI) in the QoS parameter. This is not specifically limited in this embodiment of this application. The 5QI may represent a service requirement such as a requirement of a delay or a jitter. For details, refer to existing descriptions. Details are not described herein again.

In addition, the QoS parameter may further include at least one of an allocation and retention priority (ARP), guaranteed bandwidth, a maximum flow bit rate (MFBR), and a guaranteed flow bit rate (GFBR). This is not specifically limited in this embodiment of this application.

It should be noted that, in this embodiment of this application, the detection indication information includes the service type, for example, the detection indication information includes 5QI=1, and 5QI=1 is used to represent the service type. In this case, an object of quality of service detection of a service may be one or more QoS flows whose service type is 5QI=1. If the object of the quality of service detection of the service is a plurality of QoS flows whose service types are 5QI=1, when the quality of service detection of the service is subsequently performed, the quality of service detection of the service needs to be performed on each QoS flow whose service type is 5QI=1 according to the following method. Descriptions are provided herein, and details are not described below again.

Optionally, the detection indication information in this embodiment of this application may further include at least one of an operation type, a sending period of a detection packet, a detection type, and a context identifier of the detection packet. The operation type is the quality of service detection of the service. For related descriptions of the sending period of the detection packet, the detection type, and the context identifier of the detection packet, refer to the preamble part of DESCRIPTION OF EMBODIMENTS. Details are not described herein again.

Optionally, in this embodiment of this application, the PCF entity may determine the detection indication information based on at least one of a QoS requirement, a local policy, and a local context that are of the service.

For example, the PCF entity may determine the detection indication information based on the QoS requirement of the service, and the detection indication information includes the sending period of the detection packet. For example, in the QoS requirement, a 6 ms end-to-end delay is required for packet transmission. In this case, it may be determined that the sending period of the detection packet is 2 ms.

Alternatively, for example, the PCF entity may determine the detection indication information based on the QoS requirement of the service, and the detection indication information includes the service type, the sending period of the detection packet, the detection type, and the context identifier of the detection packet. For example, in the QoS requirement, a 6 ms end-to-end delay is required for packet transmission, and a corresponding QoS parameter includes 5QI=1. In this case, all service flows whose service type is 5QI=1 may be determined, the sending period of the detection packet is 2 ms, the detection type is service transmission performance detection, and the context identifier of the detection packet is 5.

Alternatively, for example, the PCF entity may determine the detection indication information based on the local policy, and the detection indication information includes the service type. For example, the local policy may be performing the quality of service detection of the service on all the service flows whose service types are 5QI=1. In this case, all service flows whose service types are 5QI=1 may be determined.

Alternatively, for example, the PCF entity may determine the detection indication information based on the QoS requirement and the local policy of the service. The detection indication information includes the service type, the sending period of the detection packet, the detection type, and the context identifier of the detection packet. For example, the local policy may be performing the quality of service detection of the service on all the service flows whose service types are 5QI=1. In this case, all the service flows whose service types are 5QI=1 may be determined. In addition, with reference to the QoS requirement, it may be determined that in the QoS requirement corresponding to 5QI=1, a 6 ms end-to-end delay is required for packet transmission. Further, it may be determined that the sending period of the detection packet is 2 ms, the detection type is the service transmission performance detection, a detection instruction is used to instruct the packet sending device to detect the quality of service of the service, and the context identifier of the detection packet is 5.

Alternatively, for example, the PCF entity may determine the detection indication information based on the local context. The local context includes the QoS requirement of the service, and the detection indication information includes the service type of the service. For example, the local context includes a QoS requirement of the service, in which a 6 ms end-to-end delay is required for packet transmission, and the corresponding QoS parameter includes 5QI=1. In this case, all the service flows whose service types are 5QI=1 may be determined.

Alternatively, for example, the PCF entity may determine the detection indication information based on the local context and the local policy. The local context includes the QoS requirement of the service, the detection indication information includes the service flow identifier or the service type, the operation type, the sending period of the detection packet, the detection type, and the context identifier of the detection packet. For example, the local policy may be performing the quality of service detection of the service on all the service flows whose service types are 5QI=1. In this case, all the service flows whose service types are 5QI=1 may be determined. In addition, with reference to the QoS requirement in the local context, it is determined that in the QoS requirement corresponding to 5QI=1, a 6 ms end-to-end delay is required for packet transmission. Further, it may be determined that the sending period of the detection packet is 2 ms, the detection type is the service transmission performance detection, the operation type is the quality of service detection of the service, and the context identifier of the detection packet is 5. In addition, optionally, service flow identifiers of all the service flows whose service types are 5QI=1 may be further obtained by searching the local context, and the service flow identifier may be, for example, address information of a terminal or a 5-tuple.

It should be noted that the foregoing examples are merely examples for descriptions of determining, by the PCF entity, the detection indication information based on at least one of the QoS requirement, the local policy, and the local context that are of the service. The local policy may alternatively be performing the quality of service detection of the service on a specific service flow. The QoS parameter may alternatively be 5QI=3, ARP=2, or the like. This is not specifically limited in this embodiment of this application.

S1002. The PCF entity sends the detection indication information to an SMF entity, so that the SMF entity receives the detection indication information from the PCF entity.

S1003. The SMF entity sends the detection indication information to the packet sending device, so that the packet sending device receives the detection indication information from the SMF entity.

S1004. The packet sending device associates the detection indication information with a service flow of the service.

Optionally, in this embodiment of this application, if the packet sending device is a terminal or a UPF entity, the service flow includes a service aggregation flow or a service subflow; or if the packet sending device is an access device, the service flow includes a service aggregation flow.

In this case, the associating, by the packet sending device, the detection indication information with a service flow of the service may specifically include:

determining, by the packet sending device, the service flow of the service based on the detection indication information; generating, by the packet sending device, a local context of the detection packet based on the detection indication information; and storing, by the packet sending device, the local context of the detection packet into a local context of the service flow of the service.

Alternatively, the associating, by the packet sending device, the detection indication information with a service flow of the service may specifically include: determining, by the packet sending device, the service flow of the service based on the detection indication information; and generating, by the packet sending device, a local context of the detection packet based on the detection indication information, where the local context of the detection packet includes the service flow identifier of the service flow.

It should be noted that in this embodiment of this application, the packet sending device determines the service flow of the service based on the detection indication information, and the packet sending device generates the local context of the detection packet based on the detection indication information. There is no necessary sequence between the two steps. Either of the two steps may be performed first, or the two steps may be simultaneously performed. This is not specifically limited in this embodiment of this application.

Alternatively, optionally, in this embodiment of this application, if the packet sending device is an access device, the service flow includes the service subflow.

In this case, the associating, by the packet sending device, the detection indication information with a service flow of the service may specifically include: determining, by the packet sending device based on the detection indication information, a service aggregation flow to which the service flow of the service belongs; generating, by the packet sending device, a local context of the detection packet based on the detection indication information; and storing, by the packet sending device, the local context of the detection packet into a local context of the aggregation flow.

Alternatively, the associating, by the packet sending device, the detection indication information with a service flow of the service may specifically include: determining, by the packet sending device based on the detection indication information, a service aggregation flow to which the service flow of the service belongs; and generating, by the packet sending device, a local context of the detection packet based on the detection indication information, where the local context of the detection packet includes a service flow identifier of the service aggregation flow.

In other words, in this embodiment of this application, for the QoS flow or a specific service flow in the QoS flow, the access device binds the context of the detection packet to the QoS flow.

It should be noted that in this embodiment of this application, the packet sending device determines, based on the detection indication information, the service aggregation flow to which the service flow of the service belongs; and the packet sending device generates the local context of the detection packet based on the detection indication information. There is no necessary sequence between the two steps. Either of the two steps may be performed first, or the two steps may be simultaneously performed. This is not specifically limited in this embodiment of this application.

S1005. A packet receiving device obtains a parameter required by the packet receiving device.

Different packet detection types correspond to different parameters required by the packet receiving device. For details, refer to the description in the preamble part of DESCRIPTION OF EMBODIMENTS. Details are not described herein again.

For a manner in which the packet receiving device obtains the parameter required by the packet receiving device, refer to the manner in which the packet sending device obtains the detection indication information in steps S1001 to S1003. Details are not described herein again.

S1006. The packet receiving device associates the parameter required by the packet receiving device with the service flow of the service.

Optionally, in this embodiment of this application, if the packet receiving device is a terminal or a UPF entity, the service flow includes the service aggregation flow or the service subflow; or if the packet receiving device is an access device, the service flow includes the service aggregation flow.

In this case, the associating, by the packet receiving device, the parameter required by the packet receiving device with the service flow of the service may specifically include: determining, by the packet receiving device, the service flow of the service based on the parameter required by the packet receiving device; generating, by the packet receiving device, the local context of the detection packet based on the parameter required by the packet receiving device; and storing, by the packet receiving device, the local context of the detection packet into the local context of the service flow of the service.

The associating, by the packet receiving device, the parameter required by the packet receiving device with the service flow of the service may specifically include: determining, by the packet receiving device, the service flow of the service based on the parameter required by the packet receiving device; and generating, by the packet receiving device, the local context of the detection packet based on the parameter required by the packet receiving device, where the local context of the detection packet includes the service flow identifier of the service.

It should be noted that in this embodiment of this application, the packet receiving device determines the service flow of the service based on the parameter required by the packet receiving device, and the packet receiving device generates the local context of the detection packet based on the parameter required by the packet receiving device. There is no necessary sequence between the two steps. Either of the two steps may be performed first, or the two steps may be simultaneously performed. This is not specifically limited in this embodiment of this application.

Alternatively, optionally, in this embodiment of this application, if the packet receiving device is an access device, the service flow includes the service subflow.

In this case, the associating, by the packet receiving device, the parameter required by the packet receiving device with the service flow of the service may specifically include: determining, by the packet receiving device based on the parameter required by the packet receiving device, the service aggregation flow to which the service flow of the service belongs; generating, by the packet receiving device, the local context of the detection packet based on the parameter required by the packet receiving device; and storing, by the packet receiving device, the context of the detection packet into a context of the aggregation flow.

Alternatively, the associating, by the packet receiving device, the parameter required by the packet receiving device with the service flow of the service may specifically include: determining, by the packet receiving device based on the parameter required by the packet receiving device, the service aggregation flow to which the service flow of the service belongs; and generating, by the packet receiving device, the local context of the detection packet based on the parameter required by the packet receiving device, where the local context of the detection packet includes the service flow identifier of the service aggregation flow.

In other words, in this embodiment of this application, for the QoS flow or a specific service flow in the QoS flow, the access device binds the context of the detection packet to the QoS flow.

It should be noted that in this embodiment of this application, the packet receiving device determines, based on the parameter required by the packet receiving device, the service aggregation flow to which the service flow of the service belongs; and the packet receiving device generates the context of the detection packet based on the parameter required by the packet receiving device. There is no necessary sequence between the two steps. Either of the two steps may be performed first, or the two steps may be simultaneously performed. This is not specifically limited in this embodiment of this application.

Optionally, there is no necessary execution sequence between steps S1005 and S1006 and steps S1001 to S1004. Steps S1001 to S1004 may be performed before steps S1005 and S1006. Alternatively, steps S1005 and S1006 may be performed before steps S1001 to S1004. Alternatively, steps S1001 to S1004 and steps S1005 and S1006 may be simultaneously performed. This is not specifically limited in this embodiment of this application.

At this time, a configuration procedure of the quality of service detection of the service ends. Further, the packet sending device and the packet receiving device may jointly detect the quality of service of the service. Details are described in steps S1007 to S1009.

S1007. The packet sending device constructs the detection packet based on the detection indication information.

For a packet format of the detection packet, refer to the preamble part of DESCRIPTION OF EMBODIMENTS. Details are not described herein again.

Optionally, the detection packet includes at least one of the sending period of the detection packet, the detection type, and the context identifier of the detection packet.

S1008. The packet sending device sends the detection packet to the packet receiving device, so that the packet receiving device receives the detection packet from the packet sending device.

Optionally, if the detection indication information includes the sending period of the detection packet, the packet sending device may send the detection packet to the packet receiving device based on the sending period of the detection packet. This is not specifically limited in this embodiment of this application.

S1009. The packet receiving device determines the quality of service of the service based on the detection packet.

For example, assuming that the detection type is link connectivity detection, and the detection packet carries the context identifier of the detection packet, after receiving the detection packet, the packet receiving device may find the local context of the detection packet based on the context identifier of the detection packet, and further determine the quality of service of the service based on a receiving period of the detection packet and a fault decision threshold in the local context of the detection packet. For example, if the receiving period of the detection packet is 2 ms, the fault decision threshold should be set to 6. To be specific, if no detection packet is received in three periods, it is determined that a link is faulty, and an actual receiving case may be as follows.

The detection packet arrives as scheduled, and the packet receiving device determines that the link is good and the quality of service of the service is relatively good.

An interval between a time at which a packet arrives and a time at which an adjacent packet arrives exceeds six periods. To be specific, after a detection packet arrives, the packet receiving device does not receive a new detection packet in six consecutive periods. In this case, the packet receiving device determines that the link is faulty and the quality of service of the service is relatively poor.

The interval between a time at which a packet arrives and a time at which an adjacent packet arrives exceeds three periods. To be specific, after a detection packet arrives, the packet receiving device does not receive a new detection packet in three consecutive periods. In this case, the packet receiving device determines that the link deteriorates and the quality of service of the service is relatively poor. This case may be specifically the following scenarios: When the link is good, the packet receiving device receives a detection packet in each period. When the link deteriorates due to network congestion or the like, the packet receiving device cannot receive a detection packet in several consecutive periods (for example, three consecutive periods), but a delay requirement of the service flow is still met. This case indicates that the link already deteriorates and the link is very likely to be faulty subsequently due to further deterioration, that is, the link cannot meet the delay requirement of the service flow. Therefore, when a network is aware of such case, link optimization or fault location can be pertinently performed to avoid a possible link fault without being noticed by an application as possible, so as to improve the quality of service of the service.

Based on the method for detecting quality of service of a service provided in this embodiment of this application, the packet sending device can obtain the detection indication information, and send the detection packet to the packet receiving device based on the detection indication information; and after receiving the detection packet from the packet sending device, the packet receiving device can determine the quality of service of the service based on the detection packet. Therefore, the quality of service of the service can be detected based on the solution.

Actions of the PCF entity, the SMF entity, the packet sending device, and the packet receiving device in steps S1001 to S1009 may be performed by the processor 901 in the communications device 900 shown in FIG. 9 by invoking the application program code stored in the memory 903. This is not limited in this embodiment of this application.

Figure 11:
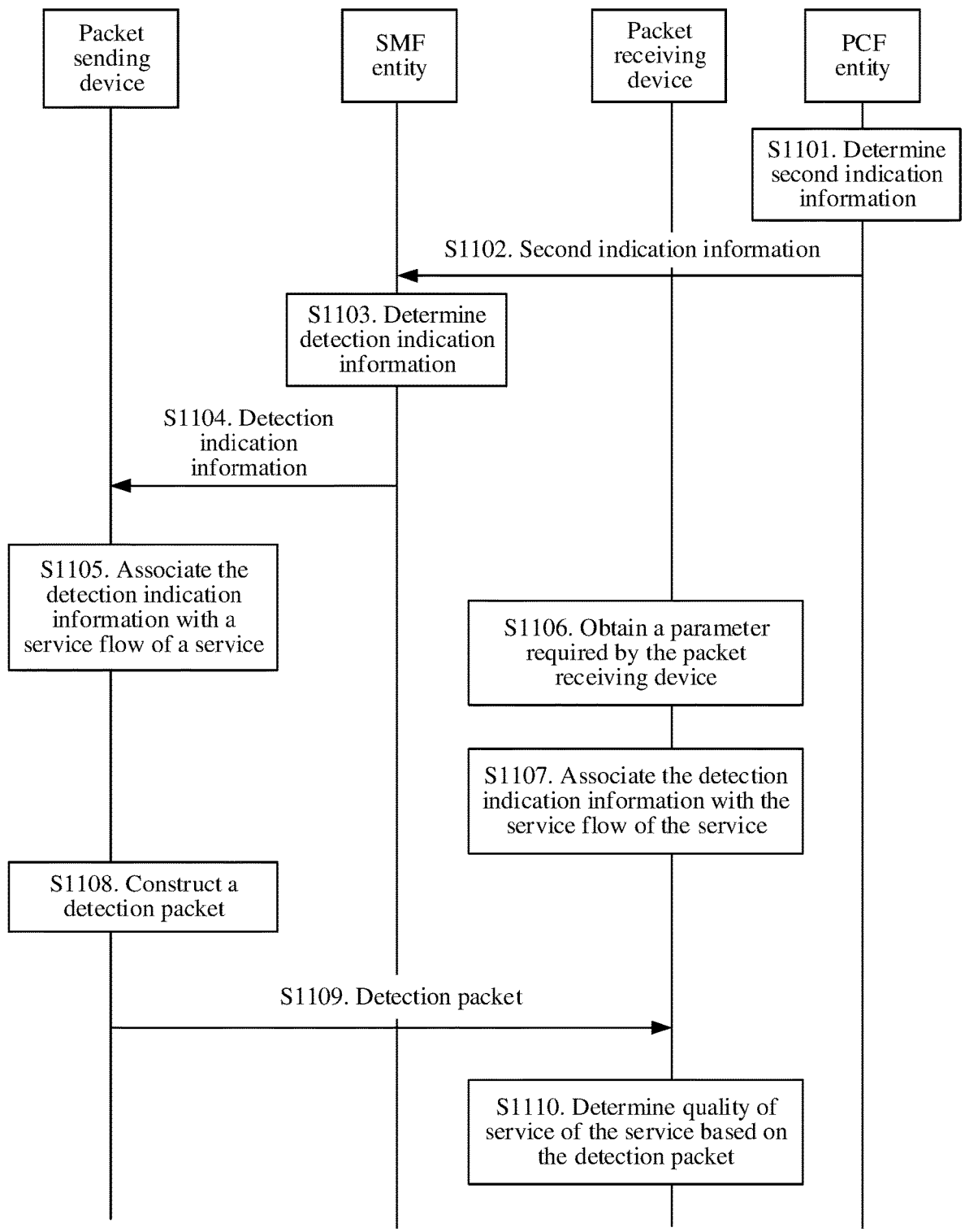
FIG. 11 is a schematic flowchart 2 of a method for detecting quality of service of a service according to an embodiment of this application.

Optionally, the system 50 for detecting quality of service of a service shown in FIG. 5 is applied to the 5G network shown in FIG. 6. As shown in FIG. 11, another method for detecting quality of service of a service provided in an embodiment of this application includes the following steps.

S1101. A PCF entity obtains second indication information.

The second indication information includes at least one of an operation type, a service type of a service, address information of a terminal, a quality of service parameter, and a 5-tuple, where the operation type is quality of service detection of a service, and at least one of the address information of the terminal, the quality of service parameter, and the 5-tuple is used to indicate a service flow of the service.

Optionally, in this embodiment of this application, the PCF entity may determine the second indication information based on at least one of a QoS requirement, a local policy, and a local context that are of the service.

For example, the PCF entity may determine the second indication information based on the QoS requirement of the service, and the second indication information includes the service type of the service. For example, in the QoS requirement, a 6 ms end-to-end delay is required for packet transmission, and a corresponding QoS parameter includes 5QI=1. In this case, all the service flows whose service types are 5QI=1 may be determined.

Alternatively, for example, the PCF entity may determine the second indication information based on the local policy, and the second indication information includes the service type of the service. For example, the local policy may be performing the quality of service detection of the service on all the service flows whose service types are 5QI=1. In this case, all the service flows whose service types are 5QI=1 may be determined.

Alternatively, for example, the PCF entity may determine the second indication information based on the local context, where the local context includes the QoS requirement of the service, and the second indication information includes the QoS parameter. For example, the local context includes the QoS requirement of the service, in which a 6 ms end-to-end delay is required for packet transmission, and the corresponding QoS parameter includes 5QI=1. In this case, it may be determined that the QoS parameter includes 5QI=1.

Alternatively, for example, the PCF entity may generate the second indication information based on the local context and the local policy, and the second indication information includes the service type of the service, the address information of the terminal, or the 5-tuple. For example, the local policy may be performing the quality of service detection of the service on all the service flows whose service types are 5QI=1. In this case, all the service flows whose service types are 5QI=1 may be determined. In addition, service flow identifiers of all the service flows whose service types are 5QI=1 may be obtained by searching the local context. For example, the service flow identifier may be the address information of the terminal or the 5-tuple.

It should be noted that the foregoing examples are merely examples for descriptions of determining, by the PCF entity, the second indication information based on at least one of the QoS requirement, the local policy, and the local context that are of the service. The local policy may alternatively be: performing the quality of service detection of the service on a specific service flow. The QoS parameter may alternatively be 5QI=3, ARP=2, or the like. This is not specifically limited in this embodiment of this application.

S1102. The PCF entity sends the second indication information to the SMF entity, so that the SMF entity receives the second indication information from the PCF entity.

S1103. The SMF entity determines the detection indication information based on at least one of the second indication information and the quality of service requirement, the local policy, and the local context that are of the service.

For related descriptions of the detection indication information, refer to the embodiment shown in FIG. 10. Details are not described herein again.

For example, if the second indication information includes the address information of the terminal and the QoS parameter, the SMF entity may determine a QoS flow in a PDU session of the terminal by using the address information of the terminal and the QoS parameter, to obtain a service flow identifier of the QoS flow.

Alternatively, for example, if the second indication information includes the service type of the service, the SMF entity may determine the detection indication information based on the service type and the local context, where the local context includes the QoS requirement of the service. For example, if the quality of service detection is performed on all the service flows whose service types are 5QI=1, with reference to the QoS requirement, it may be determined that a 6 ms end-to-end delay is required for packet transmission in the QoS requirement corresponding to 5QI=1, and it may be further determined that a sending period of the detection packet is 2 ms. In addition, optionally, a service flow identifier of a PDU session whose service type is 5QI=1 and a service flow identifier of a specific service flow in the QoS flow may further be obtained by searching the local context. In other words, the address information of the terminal or the 5-tuple can be obtained. Further, a QoS flow in a PDU session of the terminal may be determined based on the address information of the terminal and the QoS parameter determined based on the QoS requirement, to obtain the service flow identifier of the QoS flow.

Alternatively, for example, if the second indication information includes the address information of the terminal, the SMF entity may determine a QoS flow in a PDU session of the terminal based on the address information of the terminal and the QoS parameter determined based on the QoS requirement, to obtain the service flow identifier of the QoS flow.

Alternatively, for example, if the second indication information includes the operation type, the SMF entity may determine the detection indication information based on at least one of the quality of service requirement, the local policy, and the local context that are of the service. For specific implementation, refer to the implementation of determining, by the PCF entity, the detection indication information based on at least one of the quality of service requirement, the local policy, and the local context that are of the service in the embodiment shown in FIG. 10. Details are not described herein again.

S1104 to S1110 are the same as 1003 to S1009. For details, refer to the embodiment shown in FIG. 10. Details are not described herein again.

Based on the method for detecting quality of service of a service provided in this embodiment of this application, quality of service of the service can be detected.

Actions of the PCF entity, the SMF entity, the packet sending device, and the packet receiving device in steps S1101 to S1110 may be performed by the processor 901 in the communications device 900 shown in FIG. 9 invoking the application program code stored in the memory 903. This is not limited in this embodiment of this application.

Figure 12:
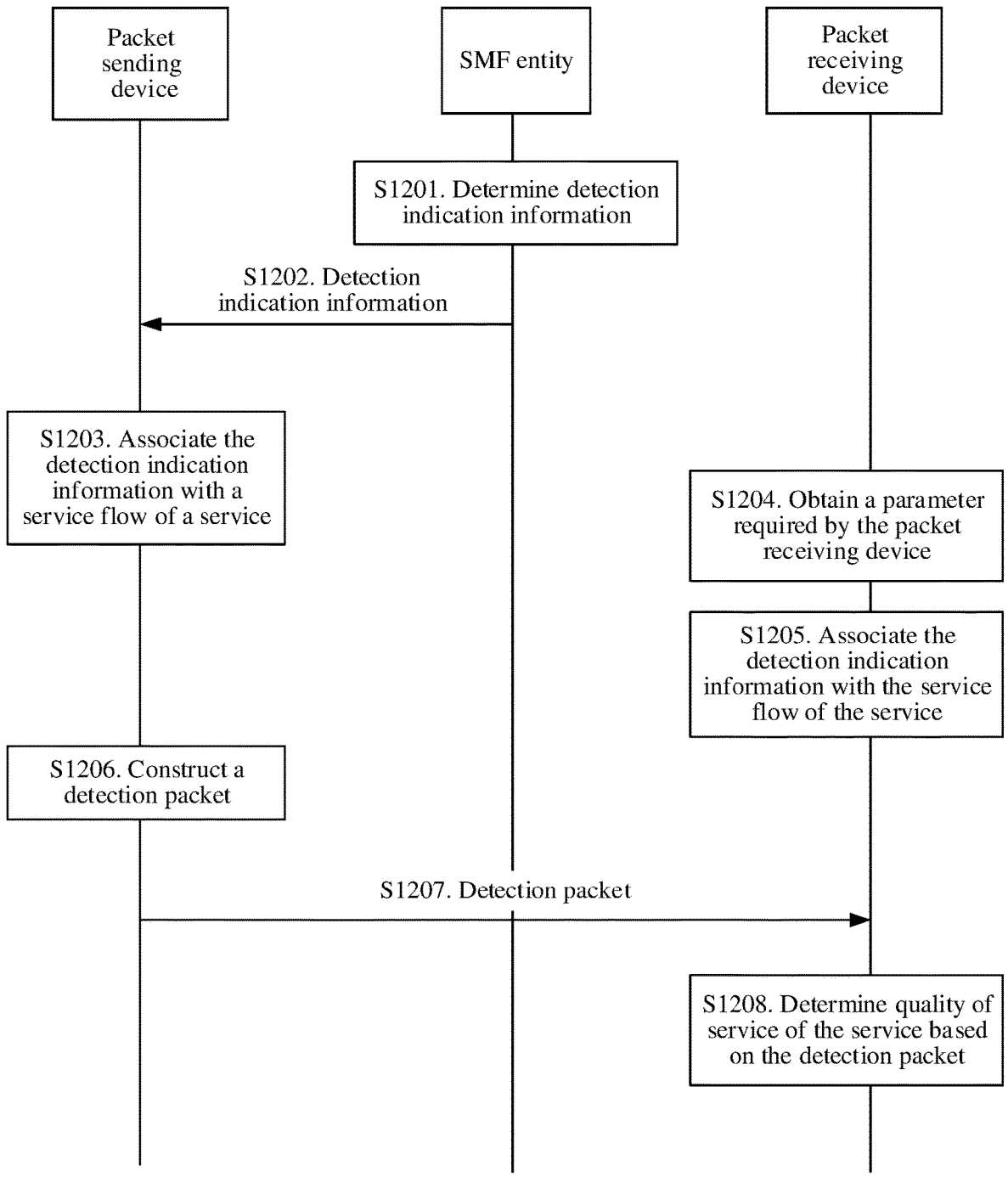
FIG. 12 is a schematic flowchart 3 of a method for detecting quality of service of a service according to an embodiment of this application.

Optionally, the system 50 for detecting quality of service of a service shown in FIG. 5 is applied to the 5G network shown in FIG. 6. As shown in FIG. 12, another method for detecting quality of service of a service provided in an embodiment of this application includes the following steps.

S1201. An SMF entity determines detection indication information based on at least one of a quality of service requirement, a local policy, and a local context that are of a service.

For related descriptions of the detection indication information, refer to the embodiment shown in FIG. 10. Details are not described herein again.

For specific implementation of step S1201, refer to the implementation of determining, by a PCF entity, the detection indication information based on at least one of the quality of service requirement, the local policy, and the local context that are of the service in the embodiment shown in FIG. 10. Details are not described herein again.

S1202 to S1208 are the same as S1003 to S1009. For details, refer to the embodiment shown in FIG. 10. Details are not described herein again.

Based on the method for detecting quality of service of a service provided in this embodiment of this application, quality of service of the service can be detected.

Actions of the SMF entity, a packet sending device, and a packet receiving device in steps S1201 to S1208 may be performed by the processor 901 in the communications device 900 shown in FIG. 9 invoking the application program code stored in the memory 903. This is not limited in this embodiment of this application.

Figure 13:
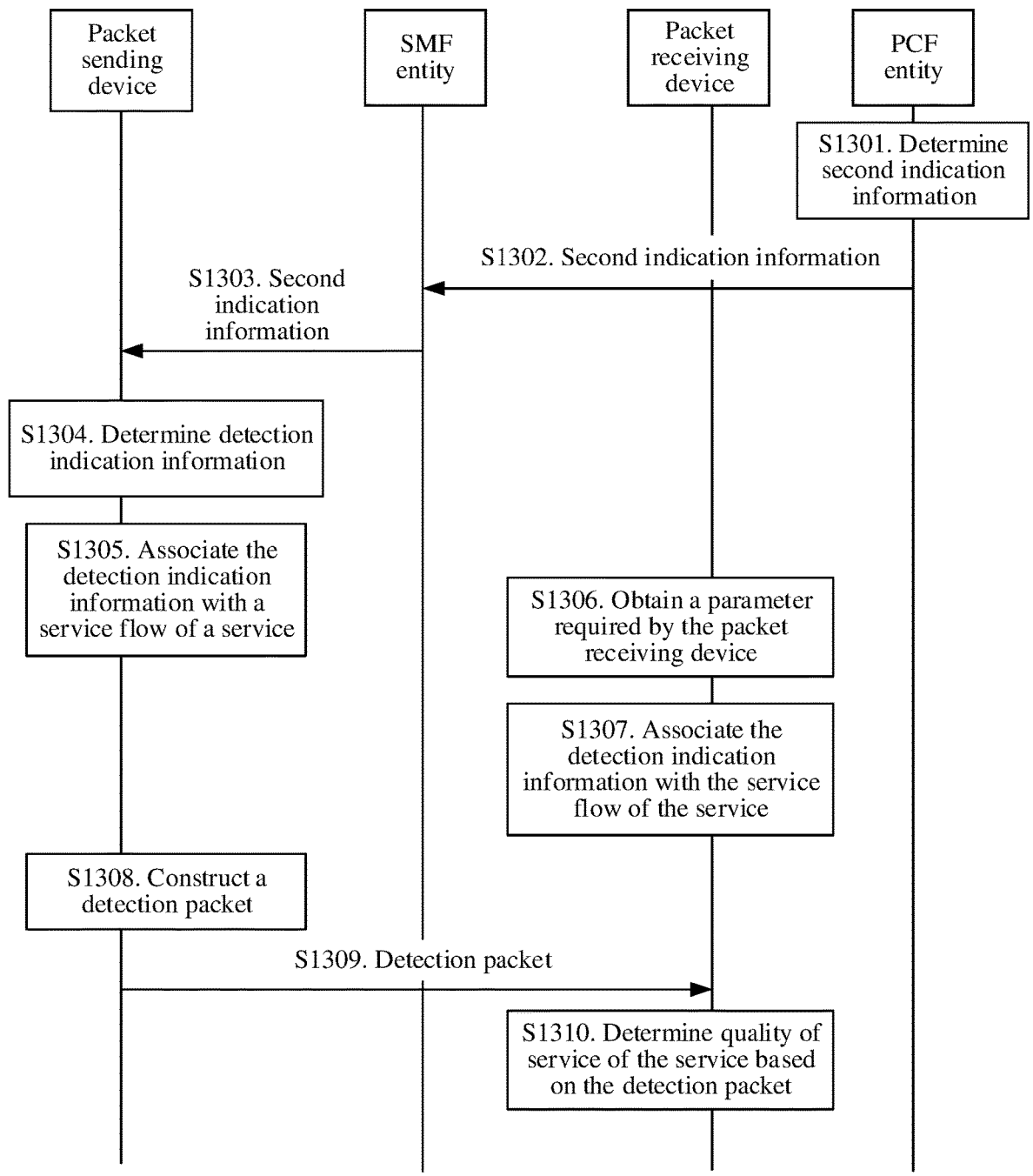
FIG. 13 is a schematic flowchart 4 of a method for detecting quality of service of a service according to an embodiment of this application.

Optionally, the system 50 for detecting quality of service of a service shown in FIG. 5 is applied to the 5G network shown in FIG. 6. As shown in FIG. 13, another method for detecting quality of service of a service provided in an embodiment of this application includes the following steps.

S1301 and S1302 are the same as S1101 and S1102. For details, refer to the embodiment shown in FIG. 11. Details are not described herein again.

S1303. An SMF entity sends second indication information to a packet sending device, so that the packet sending device receives the second indication information from the SMF entity.

S1304. The packet sending device determines detection indication information based on at least one of the second indication information and a quality of service requirement, a local policy, and a local context that are of a service.

For specific implementation of step S1304, refer to the implementation of determining, by the SMF entity, the detection indication information based on at least one of the quality of service requirement, the local policy, and the local context that are of the service in the embodiment shown in FIG. 11. Details are not described herein again.

S1305 to S1310 are the same as S1004 to S1009. For details, refer to the embodiment shown in FIG. 10. Details are not described herein again.

Based on the method for detecting quality of service of a service provided in this embodiment of this application, quality of service of the service can be detected.

Actions of a PCF entity, the SMF entity, the packet sending device, and a packet receiving device in steps S1301 to S1309 may be performed by the processor 901 in the communications device 900 shown in FIG. 9 invoking the application program code stored in the memory 903. This is not limited in this embodiment of this application.

Figure 14:
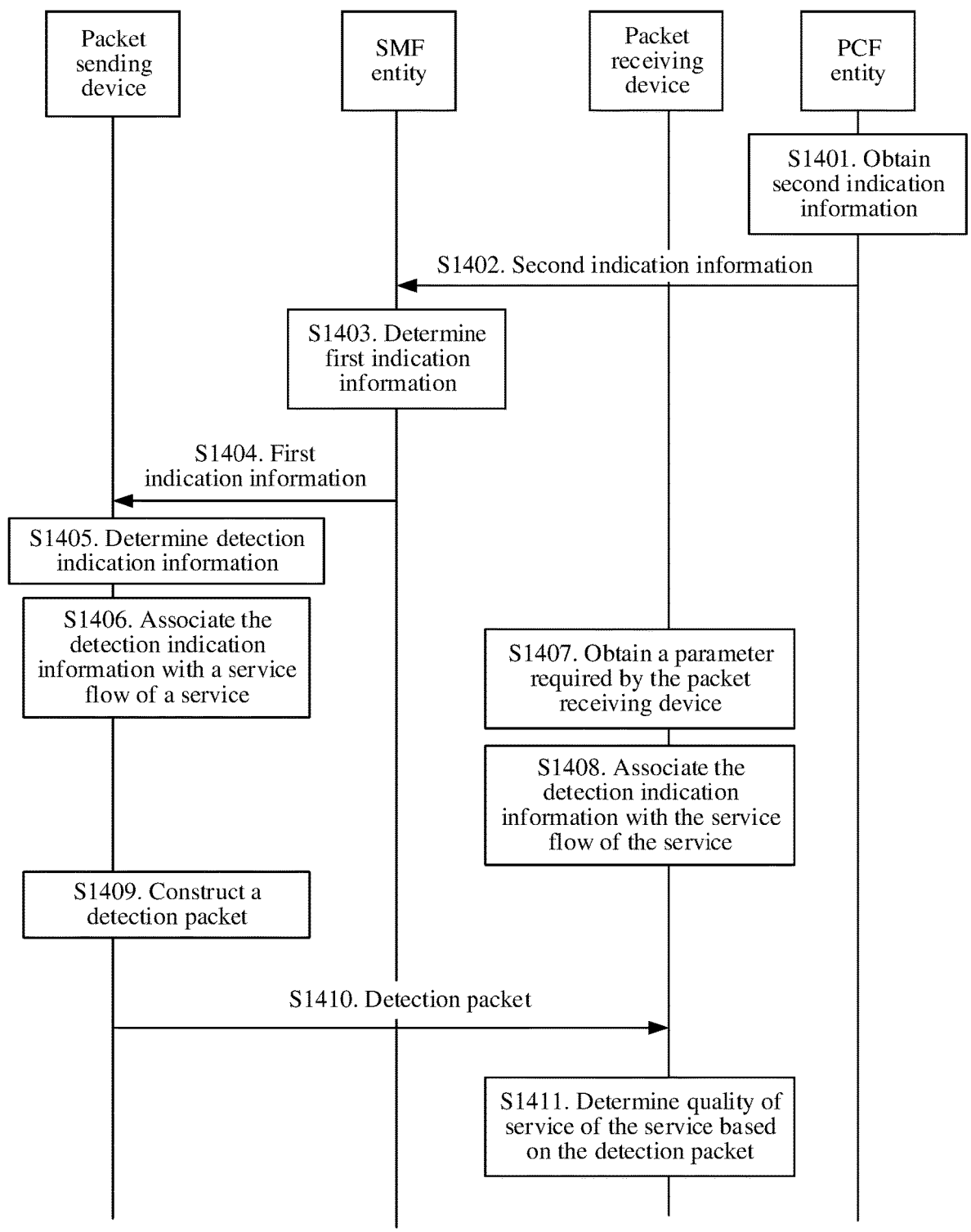
FIG. 14 is a schematic flowchart 5 of a method for detecting quality of service of a service according to an embodiment of this application.

Optionally, the system 50 for detecting quality of service of a service shown in FIG. 5 is applied to the 5G network shown in FIG. 6. As shown in FIG. 14, another method for detecting quality of service of a service provided in an embodiment of this application includes the following steps.

S1401 and S1402 are the same as S1101 and S1102. For details, refer to the embodiment shown in FIG. 11. Details are not described herein again.

S1403. An SMF entity determines first indication information based on at least one of second indication information, a quality of service requirement, a local policy, and a local context of a service.

Optionally, the first indication information in this embodiment of this application may include at least one of a service flow identifier of the service, a service type, an operation type, a sending period of a detection packet, a detection type, and a context identifier of the detection packet. For related descriptions of the service flow identifier, the service type, the operation type, the sending period of the detection packet, the detection type, and the context identifier of the detection packet, refer to the foregoing embodiment. Details are not described herein again.

Optionally, for specific implementation of step S1403, refer to the implementation of determining, by an SMF entity, detection indication information based on at least one of the second indication information and the quality of service requirement, the local policy, and the local context that are of the service in the embodiment shown in FIG. 11. Details are not described herein again.

S1404. The SMF entity sends first indication information to a packet sending device, so that the packet sending device receives the first indication information from the SMF entity.

S1405. The packet sending device determines the detection indication information based on at least one of the first indication information and the quality of service requirement, the local policy, and the local context that are of the service.

Optionally, for specific implementation of step S1405, refer to the implementation of determining, by the SMF entity, the detection indication information based on at least one of the second indication information and the quality of service requirement, the local policy, and the local context that are of the service in the embodiment shown in FIG. 11. Details are not described herein again.

S1406 to S1411 are the same as S1004 to S1009. For details, refer to the embodiment shown in FIG. 10. Details are not described herein again.

Based on the method for detecting quality of service of a service provided in this embodiment of this application, quality of service of the service can be detected.

Actions of a PCF entity, the SMF entity, the packet sending device, and a packet receiving device in steps S1401 to S1411 may be performed by the processor 901 in the communications device 900 shown in FIG. 9 invoking the application program code stored in the memory 903. This is not limited in this embodiment of this application.

Figure 15:
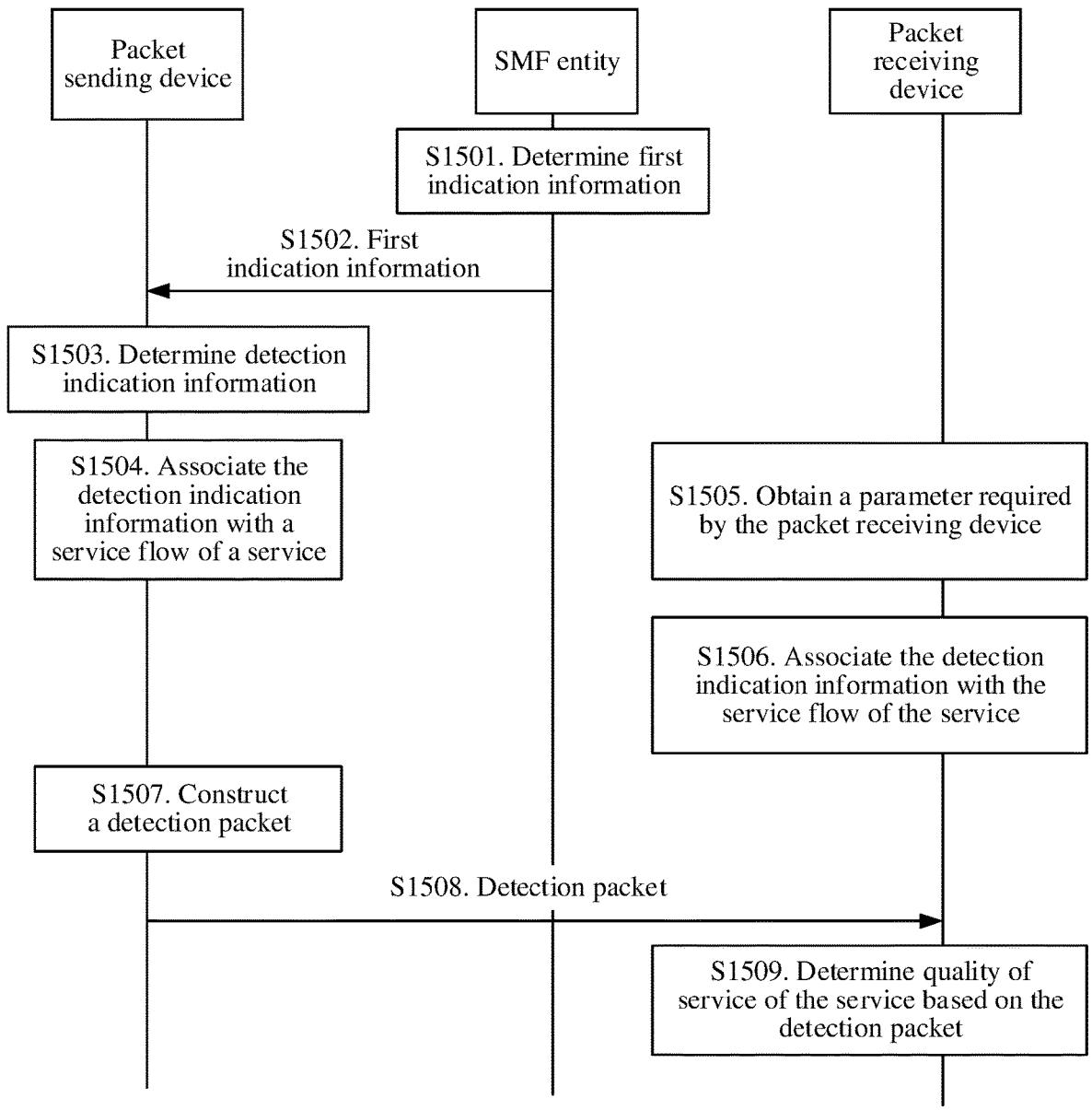
FIG. 15 is a schematic flowchart 6 of a method for detecting quality of service of a service according to an embodiment of this application.

Optionally, the system 50 for detecting quality of service of a service shown in FIG. 5 is applied to the 5G network shown in FIG. 6. As shown in FIG. 15, another method for detecting quality of service of a service provided in an embodiment of this application includes the following steps.

S1501. An SMF entity determines first indication information based on at least one of a quality of service requirement, a local policy, and a local context that are of a service.

For specific implementation of step S1501, refer to the implementation of determining, by a PCF entity, detection indication information based on at least one of the quality of service requirement, the local policy, and the local context that are of the service in the embodiment shown in FIG. 10. Details are not described herein again.

S1502 to S1509 are the same as S1404 to S1411. For details, refer to the embodiment shown in FIG. 14. Details are not described herein again.

Based on the method for detecting quality of service of a service provided in this embodiment of this application, quality of service of the service can be detected.

Actions of the SMF entity, a packet sending device, and a packet receiving device in steps S1501 to S1509 may be performed by the processor 901 in the communications device 900 shown in FIG. 9 invoking the application program code stored in the memory 903. This is not limited in this embodiment of this application.

Figure 16:
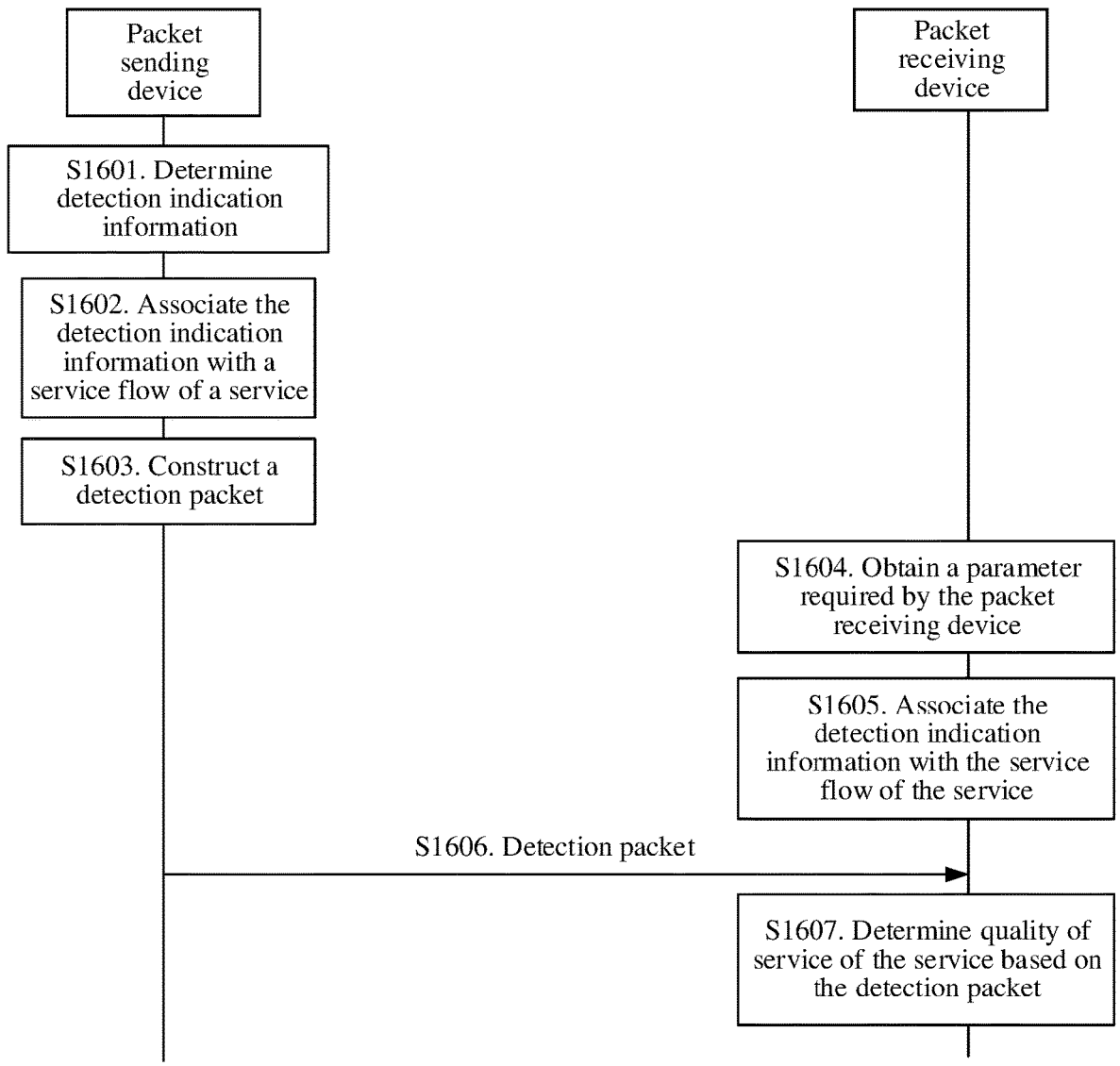
FIG. 16 is a schematic flowchart 7 of a method for detecting quality of service of a service according to an embodiment of this application.

Optionally, the system 50 for detecting quality of service of a service shown in FIG. 5 is applied to the 5G network shown in FIG. 6. As shown in FIG. 16, another method for detecting quality of service of a service provided in an embodiment of this application includes the following steps.

S1601. A packet sending device determines detection indication information based on at least one of a quality of service requirement, a local policy, and a local context that are of a service.

For specific implementation of step S1601, refer to the implementation of determining, by a PCF entity, the detection indication information based on at least one of the quality of service requirement, the local policy, and the local context that are of the service in the embodiment shown in FIG. 10. Details are not described herein again.

Optionally, in this embodiment of this application, the packet sending device may further negotiate the detection indication information with a packet receiving device. Alternatively, the packet sending device may further receive the detection indication information from the packet receiving device. Alternatively, the packet sending device may receive first indication information from the packet receiving device, and further determine the detection indication information based on the first indication information. This is not specifically limited in this embodiment of this application. For related descriptions of the first indication information, refer to the foregoing embodiment. Details are not described herein again.

S1602 to S1607 are the same as S1406 to S1411. For details, refer to the embodiment shown in FIG. 14. Details are not described herein again.

Based on the method for detecting quality of service of a service provided in this embodiment of this application, quality of service of the service can be detected.

Actions of an SMF entity, the packet sending device, and the packet receiving device in steps S1601 to S1607 may be performed by the processor 901 in the communications device 900 shown in FIG. 9 invoking the application program code stored in the memory 903. This is not limited in this embodiment of this application.

Using an example in which the system 50 for detecting quality of service of a service is applied to the 5G network shown in FIG. 6, several methods for detecting quality of service of a service are provided in FIG. 10 to FIG. 16. The method for detecting quality of service of a service may also be applied to the 4G network shown in FIG. 7 or the 4.5G network shown in FIG. 8. A main difference is as follows.

If the method for detecting quality of service of a service may be applied to the 4G network shown in FIG. 7, the UPF entity and the SMF entity in the embodiments shown in FIG. 10 to FIG. 16 need to be replaced with a GW in the 4G network, the PDU session in the embodiments shown in FIG. 10 to FIG. 16 needs to be replaced with a PDN connection, and the QoS flow in the embodiments shown in FIG. 10 to FIG. 16 needs to be replaced with a bearer, the QoS parameter in the embodiments shown in FIG. 10 to FIG. 16 needs to be replaced with a QoS parameter in the 4G network, and so on. In other words, network elements in the embodiments shown in FIG. 10 to FIG. 16 need to be replaced with related network elements in the 4G network, and concepts in the embodiments shown in FIG. 10 to FIG. 16 need to be replaced with related concepts in the 4G network. In addition, it should be noted that because the UPF entity and the SMF entity in the embodiments shown in FIG. 10 to FIG. 16 are replaced with the GW in the 4G network, when the method for detecting quality of service of a service shown in FIG. 10 to FIG. 16 is applied to the 4G network, integration of functions of the UPF entity and the SMF entity needs to be considered. For example, when the method for detecting quality of service of a service shown in FIG. 10 to FIG. 12 is applied to the 4G network, the GW sends the detection indication information to the packet sending device after determining the detection indication information. Alternatively, when the method for detecting quality of service of a service shown in FIG. 13 is applied to the 4G network, the GW sends the second indication information to the packet sending device after determining the second indication information. Alternatively, when the method for detecting quality of service of a service shown in FIG. 14 or the method for detecting quality of service of a service FIG.

15 is applied to the 4G network, the GW entity sends the first indication information to the packet sending device after determining the first indication information. For details, refer to the embodiments shown in FIG. 10 to FIG. 16, details are not described herein again.

If the method for detecting quality of service of a service can be applied to the 4.5G network shown in FIG. 8, the UPF entity in the embodiments shown in FIG. 10 to FIG. 16 needs to be replaced with a GW-U entity in the 4.5G network, the SMF entity in the embodiments shown in FIG. 10 to FIG. 16 needs to be replaced with a GW-C entity in the 4.5G network, the PDU session in the embodiments shown in FIG. 10 to FIG. 16 needs to be replaced with the PDN connection, the QoS flow in the embodiments shown in FIG. 10 to FIG. 16 needs to be replaced with the bearer, the QoS parameter in the embodiments shown in FIG. 10 to FIG. 16 needs to be replaced with a QoS parameter in the 4.5G network, and so on. In other words, the network elements in the embodiments shown in FIG. 10 to FIG. 16 need to be replaced with related network elements in the 4.5G network, and the concepts in the embodiments shown in FIG. 10 to FIG. 16 need to be replaced with related concepts in the 4.5G network. For details, refer to the embodiments shown in FIG. 10 to FIG. 16. Details are not described herein again.

The solutions provided in the embodiments of this application are mainly described from a perspective of interaction between network elements. It can be understood that, to implement the foregoing functions, the packet sending device and the first network device include corresponding hardware structures and/or software modules for performing the functions. A person skilled in the art should easily be aware that, in combination with the examples described in the embodiments disclosed in this specification, units, algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the packet sending device and the first network device based on the foregoing method examples. For example, the function modules may be divided to correspond to the corresponding functions, or two or more functions may be integrated into one processing module. The integrated module may be implemented in a form of hardware, or may be implemented in a form of a software function module. It should be noted that, in the embodiments of this application, module division is an example, and is merely a logical function division. In actual implementation, another division manner may be used.

Figure 17:
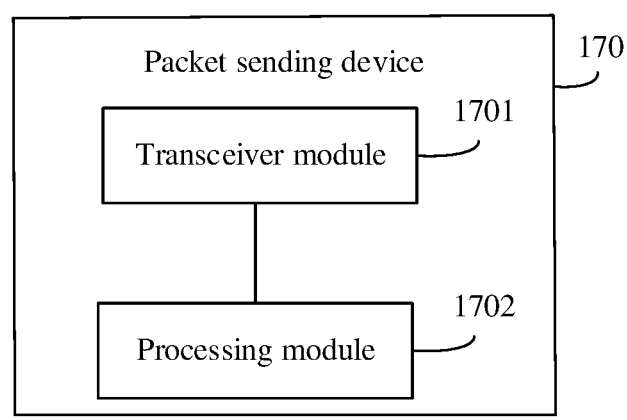
FIG. 17 is a schematic structural diagram of a packet sending device according to an embodiment of this application.

For example, if the function modules are divided through integration, FIG. 17 is a schematic structural diagram of a packet sending device 170 in the foregoing embodiments. The packet sending device 170 includes: a transceiver module 1701 and a processing module 1702. The processing module 1702 is configured to obtain detection indication information, where the detection indication information is used to instruct the packet sending device 170 to detect quality of service of a service. The transceiver module 1701 is configured to send a detection packet to a packet receiving device based on the detection indication information, where the detection packet is used to detect the quality of service of the service.

Optionally, the processing module 1702 is specifically configured to receive the detection indication information from a first network device or the packet receiving device.

Optionally, the processing module 1702 is specifically configured to determine the detection indication information based on at least one of a quality of service requirement, a local policy, and a local context that are of the service.

Optionally, the processing module 1702 is specifically configured to: receive first indication information from the first network device or the packet receiving device, where the first indication information is used to instruct the packet sending device 170 to detect the quality of service of the service; and determine the detection indication information based on at least one of the first indication information and the quality of service requirement, the local policy, and the local context that are of the service.

Optionally, the processing module 1702 is further configured to associate the detection indication information with a service flow of the service.

Optionally, the packet sending device 170 includes a terminal, a user plane function entity, a gateway, or a gateway user plane entity, and the service flow includes a service aggregation flow or a service subflow. Alternatively, the packet sending device 170 includes an access device, and the service flow includes a service aggregation flow. That the processing module 1702 is further configured to associate the detection indication information with a service flow of the service includes: determine the service flow of the service based on the detection indication information; generate a local context of the detection packet based on the detection indication information; and store the local context of the detection packet into a context of the service flow of the service.

Alternatively, optionally, the packet sending device 170 includes a terminal, a user plane function entity, a gateway, or a gateway user plane entity, and the service flow includes a service aggregation flow or a service subflow. Alternatively, the packet sending device 170 includes an access device, and the service flow includes a service aggregation flow. That the processing module 1702 is further configured to associate the detection indication information with a service flow of the service includes: determine the service flow of the service based on the detection indication information; and generate a local context of the detection packet based on the detection indication information, where the local context of the detection packet includes a service flow identifier of the service.

Alternatively, optionally, the packet sending device 170 includes an access device, and the service flow includes a service subflow. That the processing module 1702 is further configured to associate the detection indication information with a service flow of the service includes: determine, based on the detection indication information, a service aggregation flow to which the service flow of the service belongs; generate a local context of the detection packet based on the detection indication information; and store the local context of the detection packet into a local context of the aggregation flow.

Alternatively, optionally, the packet sending device 170 includes an access device, and the service flow includes a service subflow. That the processing module 1702 is further configured to associate the detection indication information with a service flow of the service includes: determine, based on the detection indication information, a service aggregation flow to which the service flow of the service belongs; and generate a local context of the detection packet based on the detection indication information, where the local context of the detection packet includes a service flow identifier of the service aggregation flow.

All related content of the steps in the foregoing method embodiment may be cited in function descriptions of corresponding function modules, and details are not described herein again.

In this embodiment, the packet sending device 170 is presented with the function modules divided through integration. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the packet sending device 170 may be in the form shown in FIG. 9.

For example, the processor 901 in FIG. 9 may invoke the computer-executable instruction stored in the memory 903, so that the packet sending device 170 performs the method for detecting quality of service of a service in the foregoing method embodiments.

Specifically, functions/implementation processes of the transceiver module 1701 and the processing module 1702 in FIG. 17 may be implemented by the processor 901 in FIG. 9 invoking the computer-executable instruction stored in the memory 903. Alternatively, functions/implementation processes of the processing module 1702 in FIG. 17 may be implemented by the processor 901 in FIG. 9 invoking the computer-executable instruction stored in the memory 903, and functions/implementation processes of the transceiver module 1701 in FIG. 17 may be implemented by the communications interface 904 in FIG. 9.

The packet sending device provided in this embodiment of this application may be configured to perform the foregoing method for detecting quality of service of a service. Therefore, for technical effects that can be achieved by the packet sending device, refer to the foregoing method embodiments. Details are not described herein again.

Figure 18:
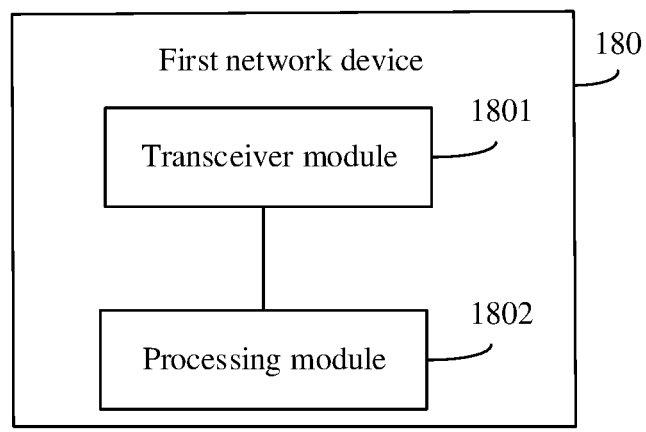
FIG. 18 is a schematic structural diagram of a first network device according to an embodiment of this application.

For example, if the function modules are divided through integration, FIG. 18 is a schematic structural diagram of a first network device 180 in the foregoing embodiments. The first network device 180 includes: a transceiver module 1801 and a processing module 1802. The processing module 1802 is configured to obtain first indication information; and the transceiver module 1801 is configured to send the first indication information to a packet sending device, where the first indication information is used to instruct the packet sending device to detect quality of service of a service.

Optionally, the processing module 1802 is specifically configured to receive the first indication information from a second network device.

Optionally, the processing module 1802 is specifically configured to determine the first indication information based on at least one of a quality of service requirement, a local policy, and a local context that are of the service.

Optionally, the processing module 1802 is specifically configured to: receive second indication information from the second network device, where the second indication information includes at least one of an operation type, a service type of the service, address information of a terminal, a quality of service parameter, and a 5-tuple; and the operation type is quality of service detection of the service, and at least one of the address information of the terminal, the quality of service parameter, and the 5-tuple is used to indicate a service flow of the service; and determine the first indication information based on at least one of the second indication information and the quality of service requirement, the local policy, and the local context that are of the service.

All related content of the steps in the foregoing method embodiment may be cited in function descriptions of corresponding function modules, and details are not described herein again.

In this embodiment, the first network device 180 is presented with the function modules divided through integration. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the first network device 180 may be in the form shown in FIG. 9.

For example, the processor 901 in FIG. 9 may invoke the computer-executable instruction stored in the memory 903, so that the first network device 180 performs the method for detecting quality of service of a service in the foregoing method embodiments.

Specifically, functions/implementation processes of the transceiver module 1801 and the processing module 1802 in FIG. 18 may be implemented by the processor 901 in FIG. 9 invoking the computer-executable instruction stored in the memory 903. Alternatively, functions/implementation processes of the processing module 1802 in FIG. 18 may be implemented by the processor 901 in FIG. 9 invoking the computer-executable instruction stored in the memory 903, and functions/implementation processes of the transceiver module 1801 in FIG. 18 may be implemented by the communications interface 904 in FIG. 9.

The first network device provided in this embodiment of this application may be configured to perform the foregoing method for detecting quality of service of a service. Therefore, for technical effects that can be achieved by the first network device, refer to the foregoing method embodiments. Details are not described herein again.

In the foregoing embodiments, the packet sending device 170 and the first network device 180 are presented with the function modules divided through integration. In the embodiments of this application, the function modules of the packet sending device and the first network device may be divided to correspond to the functions. This is not specifically limited in the embodiments of this application.

Optionally, an embodiment of this application provides a chip system, where the chip system includes a processor configured to support a packet sending device in implementing the method for detecting quality of service of a service, for example, obtaining detection indication information. In a possible design, the chip system further includes a memory. The memory is configured to store a program instruction and data that are necessary for the packet sending device. The chip system may include a chip, or may include a chip and another discrete component. This is not specifically limited in this embodiment of this application.

Optionally, an embodiment of this application provides a chip system, where the chip system includes a processor configured to support a first network device in implementing the method for detecting quality of service of a service, for example, obtaining first indication information. In a possible design, the chip system further includes a memory. The memory is configured to store a program instruction and data that are necessary for the first network device. The chip system may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device such as a server or a data center integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "including" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof. It is clear that, various modifications and combinations may be made to them without departing from the spirit and scope of this application. Correspondingly, the specification and accompanying drawings are merely example descriptions of this application defined by the accompanying claims, and are considered as any of or all modifications, variations, combinations or equivalents that cover the scope of this application. It is clear that, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for detecting service quality, wherein the method comprise
    obtaining, by a user plane function entity configured to send packets, detection indication information from a session management network entity, wherein the detection indication information instructs the user plane function entity to detect a quality of service of a service, wherein the detection indication information is based on at least one of a quality of service requirement, a local policy, or a local context of the service, wherein the detection indication information comprises a detection type which indicates a type of the quality of service detection to be performed on detection packets, wherein the detection type is loopback detection to measure at least a loopback delay in transmission of a detection packet between the user plane function entity and a packet receiving device, wherein the detection indication information further comprises a service flow identifier of the service, and wherein the service flow identifier indicates a service flow of the service;
    sending, by the user plane function entity, the detection packet to the packet receiving device based on the detection indication information;
    receiving, by the packet receiving device, the detection packet from the user plane function entity; and
    detecting, by the packet receiving device, the quality of service of the service based on the detection packet, wherein the detection packet and a service packet of the service use a same $3^{rd}$ Generation Partnership Project (3GPP) network protocol header.

2. The method of claim 1, wherein the detection information further comprises a sending period in which detection packets are to be periodically sent.

3. The method of claim 2, wherein the sending period is based on an end-to-end delay required for transmission of the detection packet.

4. The method of claim 1, wherein the detection indication information further comprises a service type of the service.

5. The method of claim 1, further comprising associating, by the user plane function entity, the detection indication information with the service flow of the service.

6. The method of claim 5, wherein the service flow comprises a service aggregation flow or a service subflow, wherein associating the detection indication information with the service flow of the service comprises first steps or second steps, and wherein the first steps comprise:
    determining, by the user plane function entity, the service flow of the service based on the detection indication information;
    generating, by the user plane function entity, a context of the detection packet based on the detection indication information; and
    storing, by the user plane function entity, the context of the detection packet into a context of the service flow of the service, and
    wherein the second steps comprise:
    determining, by the user plane function entity, the service flow of the service based on the detection indication information; and
    generating, by the user plane function entity, a context of the detection packet based on the detection indication information, wherein the context of the detection packet comprises a service flow identifier of the service.

7. The method of claim 5, wherein the service flow comprises a service subflow.

8. The method of claim 1, wherein the detection type comprises link connectivity detection.

9. The method of claim 1, wherein the detection type comprises service transmission performance detection.

10. The method of claim 1, wherein the loopback detection detects a fault in a transmission path.

11. The method of claim 1, further comprising determining, by the session management network entity, the detection indication information based on at least one of the quality of service requirement, the local policy, or the local context of the service.

12. A detection system for detecting service quality, wherein the detection system comprises:
a user plane function entity configured to:
obtain detection indication information from a session management network entity, wherein the detection indication information is based on at least one of a quality of service requirement, a local policy, or a local context of the service, wherein the detection indication information instructs the user plane function entity to detect a quality of service of a service, wherein the detection indication information comprises a detection type which indicates a type of a quality of service detection to be performed on detection packets, wherein the detection indication information further comprises a service flow identifier of the service, and wherein the service flow identifier indicates a service flow of the service; and
send a detection packet based on the detection indication information; and
a packet receiving device configured to:
receive the detection packet from the user plane function entity; and
detect the quality of service of the service based on the detection packet, wherein the detection type is loopback detection to measure at least a loopback delay in transmission of the detection packet between the user plane function entity and the packet receiving device, and wherein the detection packet and a service packet of the service use a same $3^{rd}$ Generation Partnership Project (3GPP) network protocol header.

13. The detection system of claim 12, wherein the session management network entity is configured to send the detection indication information to the user plane function entity.

14. The detection system of claim 12, wherein the detection information further comprises a sending period.

15. The detection system of claim 14, wherein the sending period is a time interval between sending the detection packet and sending an adjacent packet.

16. The detection system of claim 12, wherein the detection indication information further comprises a service type of the service.

17. A user plane function entity comprising:
at least one processor; and
a memory configured to store computer-executable instructions, which when executed by the at least one processor, cause the user plane function entity to:
obtain detection indication information from a session management network entity, wherein the detection indication information is based on at least one of a quality of service requirement, a local policy, or a local context of the service, wherein the detection indication information instructs the user plane function entity to detect a quality of service of a service, wherein the detection indication information comprises a detection type that indicates a type of a quality of service detection to be performed on detection packets, wherein the detection indication information further comprises a service flow identifier of the service, and wherein the service flow identifier indicates a service flow of the service; and
send a detection packet to a packet receiving device based on the detection indication information, wherein the detection packet and a service packet of the service use a same $3^{rd}$ Generation Partnership Project (3GPP) network protocol header, wherein the detection packet is for detecting the quality of service of the service, and wherein the detection type is loopback detection to measure at least a loopback delay in transmission of the detection packet between the user plane function entity and the packet receiving device.

18. The user plane function entity of claim 17, wherein the detection information further comprises a sending period for periodic quality of service monitoring.

19. A method for detecting service quality, the method comprising:
obtaining, by a user plane function entity, detection indication information from a session management network entity, wherein the detection indication information instructs the user plane function entity to detect a quality of service of a service, wherein the detection indication information comprises a detection type which indicates a type of quality of service detection to be performed on detection packets, wherein the detection indication information further comprises a service flow identifier of the service, and wherein the service flow identifier indicates a service flow of the service, and wherein the detection indication information is based on at least one of a quality of service requirement, a local policy, or a local context of the service; and
sending, by the user plane function entity, a detection packet to a packet receiving device based on the detection indication information, wherein the detection packet and a service packet of the service use a same $3^{rd}$ Generation Partnership Project (3GPP) network protocol header, wherein the detection packet is for detecting the quality of service of the service, and wherein the detection type is loopback detection to measure at least a loopback delay in transmission of the detection packet between the user plane function entity and the packet receiving device.

20. The method of claim 19, wherein the detection information further comprises a sending period based on an end-end-end delay requirement.

* * * * *

UNITED STATES PATENT AND TRADEMARK OFFICE
CERTIFICATE OF CORRECTION

PATENT NO. : 11,606,726 B2
APPLICATION NO. : 16/828562
DATED : March 14, 2023
INVENTOR(S) : Dekui Sun, Han Zhou and Zaifeng Zong It is certified that error appears in the above-identified patent and that said Letters Patent is hereby corrected as shown below:

In the Claims

Claim 1, Column 37, Line 61: "method comprise" should read "method comprises:"

Claim 17, Column 40, Line 3: "wherein" should read "and wherein"

Signed and Sealed this
Ninth Day of May, 2023

Katherine Kelly Vidal
*Director of the United States Patent and Trademark Office*